(12) United States Patent
Dong et al.

(10) Patent No.: US 10,200,894 B2
(45) Date of Patent: Feb. 5, 2019

(54) FACILITATING INTERFERENCE MANAGEMENT IN MULTI-CELL AND MULTI-USER MILLIMETER WAVE CELLULAR NETWORKS

(71) Applicant: City University of Hong Kong, Kowloon (HK)

(72) Inventors: MiaoMiao Dong, Hong Kong (CN); WaiMing Chan, Hong Kong (CN); Taejoon Kim, Hong Kong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 86 days.

(21) Appl. No.: 15/136,265

(22) Filed: Apr. 22, 2016

(65) Prior Publication Data

US 2017/0311187 A1    Oct. 26, 2017

(51) Int. Cl.
*H04W 24/08*    (2009.01)
*H04B 7/0408*    (2017.01)
(Continued)

(52) U.S. Cl.
CPC .......... *H04W 24/08* (2013.01); *H04B 7/024* (2013.01); *H04B 7/0408* (2013.01);
(Continued)

(58) Field of Classification Search
CPC .. H04W 24/08; H04W 28/048; H04B 7/0408; H04B 1/0475; H04B 1/1027; H04B 7/0857; H04B 7/0636; H04B 7/088
(Continued)

(56) References Cited

U.S. PATENT DOCUMENTS

| 8,170,081 B2 * | 5/2012 | Forenza | H04B 7/0417 |
| | | | 370/278 |
| 8,542,763 B2 * | 9/2013 | Forenza | H04B 7/024 |
| | | | 375/267 |

(Continued)

FOREIGN PATENT DOCUMENTS

| CN | 103916943 A | 7/2014 |
| CN | 104052535 A | 9/2014 |

(Continued)

*Primary Examiner* — Un C Cho
*Assistant Examiner* — Shah M Rahman
(74) *Attorney, Agent, or Firm* — Amin, Turocy & Watson, LLP

(57) ABSTRACT

Interference management methods are proposed to facilitate multi-cell, multi-user millimeter wave cellular networks. One method includes a feedback approach in which a base station (BS) device collects information from mobile devices in the cell operated by the BS device and other BS devices in other cells. Each mobile device feeds back a best beams set and a worst interference beams set to its serving BS device and the information is shared amongst other BS devices in the network. According to the information, BS devices implement a beam selection criterion to select a beam for downlink transmission. To reduce feedback cost, another method leverages the channel reciprocity in time division duplexing to use the measured uplink power and interference information to select the narrow beam for downlink transmission. The BS device selects the narrow beam that establishes a reliable channel and reduces interference to mobile devices in neighboring cells.

31 Claims, 20 Drawing Sheets

(51) Int. Cl.
*H04B 7/024* (2017.01)
*H04B 7/06* (2006.01)
*H04B 7/08* (2006.01)

(52) U.S. Cl.
CPC ........... *H04B 7/0695* (2013.01); *H04B 7/088* (2013.01); *H04B 7/0857* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 2005/0101354 A1* | 5/2005 | Yang | ................... | H04B 7/0617 455/562.1 |
| 2006/0286974 A1* | 12/2006 | Gore | ................... | H04W 16/00 455/422.1 |
| 2009/0069054 A1* | 3/2009 | Zangi | ................... | H04L 5/0023 455/562.1 |
| 2011/0274003 A1* | 11/2011 | Pare, Jr. | ................ | H04B 7/0452 370/252 |
| 2012/0044830 A1* | 2/2012 | Kim | ...................... | H04B 7/026 370/252 |
| 2012/0177142 A1* | 7/2012 | Wagner | ................ | H04B 7/0452 375/296 |
| 2013/0121185 A1* | 5/2013 | Li | ....................... | H04W 72/046 370/252 |
| 2013/0229935 A1* | 9/2013 | Gorokhov | ............. | H04L 5/0023 370/252 |
| 2013/0308717 A1* | 11/2013 | Maltsev | ............... | H04B 7/0417 375/267 |
| 2013/0322280 A1* | 12/2013 | Pi | ...................... | H04W 72/0413 370/252 |
| 2014/0003274 A1* | 1/2014 | Clerckx | ............... | H04L 25/0204 370/252 |
| 2014/0146756 A1* | 5/2014 | Sahin | ................... | H04L 1/0025 370/329 |
| 2014/0177745 A1* | 6/2014 | Krishnamurthy | .... | H04B 7/0413 375/267 |
| 2015/0139088 A1* | 5/2015 | Kogan | .................. | H04W 72/02 370/329 |
| 2015/0256239 A1* | 9/2015 | Yu | ........................ | H04B 7/0632 370/329 |
| 2016/0087704 A1* | 3/2016 | Guey | ................... | H04B 7/0617 370/336 |
| 2016/0087707 A1* | 3/2016 | Guey | ................... | H04L 27/2607 375/267 |
| 2017/0026218 A1* | 1/2017 | Shattil | .................... | H04B 7/026 |
| 2017/0141832 A1* | 5/2017 | Ji | .......................... | H04B 7/0626 |
| 2017/0257230 A1* | 9/2017 | Son | .......................... | H04B 7/04 |
| 2018/0041317 A1* | 2/2018 | Simonsson | .............. | H04B 7/024 |

FOREIGN PATENT DOCUMENTS

| | | |
|---|---|---|
| CN | 104168658 A | 11/2014 |
| CN | 104782182 A | 7/2015 |
| WO | 2013154584 A1 | 10/2013 |

* cited by examiner

| Best-M-beams set $\mathcal{M}$ | | |
|---|---|---|
| Beam_idx | Received_power | Interference |
| b_id[1] | power[1] | interference[1] |
| ... | ... | ... |
| b_id[M] | power[M] | interference[M] |

FIG. 11

Simulation Parameters

| Parameters | Values |
|---|---|
| Carrier frequency (GHz) | $f=73$GHz |
| Bandwidth (MHz) | 800MHz |
| Sector antenna plane dimension | 8*8 |
| UE antenna plane dimension | 8*8 |
| Antenna element space | Half wavelength |
| BS transmit power (dBm) | 30dBm |
| Thermal noise density (dBm/Hz) | -174dBm/Hz |
| UE noise figure (dB) | 6dB |
| Distance between BS and serving UE (m) | $U[4,14]$ |
| Speed of UE (km/h) | 3km/h |
| Minimal couple loss (dB) | 80dB |
| Pathloss (dB) R(m) | $92.4+20*\log10(f)+20*\log10(R)$ |
| Channel estimation | Ideal |
| Maximal reflection order | 2 |
| Concrete reflection loss (dB) | 7.3dB |
| Glass reflection loss (dB) | 5.7dB |
| Car reflection loss (dB) | 5.0dB |
| Human reflection loss (dB) | 9dB |
| Foliage reflection loss (dB) | 260dB |
| Codebook resolution (radian) | 0.0491 |
| Traffic model | Full buffer |
| Number of best M candidate beam | 10 |
| Number of top L interfering beam | 30 |
| Experience value $\mu$ | 0.5 |
| Length of transmit frame $T_c$ (ms) | 1ms |
| Length of beam alignment $T_o$ (ms) | $0.12 T_c$ |

FIG. 13

FACILITATING INTERFERENCE MANAGEMENT IN MULTI-CELL AND MULTI-USER MILLIMETER WAVE CELLULAR NETWORKS

BACKGROUND

I. Field

The following description relates to cellular networks, in general, and, for example, to interference management in multi-cell and multi-user millimeter wave (mmW) cellular networks.

II. Background

With the development of wireless communications growing faster than ever, the higher data rate requirement is increasing to accommodate various mobile applications. However, the overcrowded microwave spectrum, in which current 3G and 4G systems are operating, is not able to handle the growing data rate demands. Hence, there has been a gradual progression to shift the frequency upward from the microwave band to the mmW band to accommodate many gigahertz of underutilized spectrum.

The mmW communication systems operate at very high frequency (e.g., 30 Gigahertz (GHz) to 300 GHz), which can result in the mmW link suffering more serious path loss than that for a microwave link. The small wavelength of mmW signals in addition to the developments in low power complementary metal oxide semiconductor (CMOS) radio frequency (RF) circuits facilitate the use of large numbers of miniaturized antennas. The large numbers of miniaturized antennas can be easily integrated at the mmW base station (BS) device and mobile device to provide sufficient array gain by forming a narrow and directional beam using beamforming techniques. The directional narrow beams in mmW communication systems can overcome the severe path loss and boost the system throughput. However, such can involve precisely aligning the directional narrow beams at the transmitter and receiver by finding the properly precoder (precoder is used to generate the directional narrow beams at the transmitter) and combiner (combiner is used to generate the directional narrow beams at the receiver) at transmitter and receiver, respectively.

Furthermore, to provide reliable service to mobile devices in a given area, dense cell deployment is typically utilized to ensure that the distance between the mmW BS device and mobile device is in low orders-of-magnitude, thus avoiding or reducing the likelihood of serious path loss. The high density cell deployment can potentially increase the frequency efficiency and provide seamless coverage. However, dense cell deployment in which the BS devices emit highly directional narrow beams to the mobile devices could cause co-channel interference to the neighboring cells due to beam collision. The interference can significantly degrade signals and corresponding quality of service of cellular communications using the mmW band. As such, there is a desire for interference management in multi-cell, multi-user mmW cellular networks.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one embodiment, a method is provided. The method includes: receiving, by BS device including a processor and associated with a cell, pilot signals transmitted from a mobile device using different precoders at different training slots in the cell associated with the BS device; notifying, by the BS device, an index of a selected precoder of the different precoders used by the mobile device and that satisfies a defined condition; and transmitting, by the base station device, pilot signals to mobile devices, wherein the transmitting is performed using the different precoders at the different training slots. The method also includes collecting, by the BS device, feedback information from mobile devices. In some embodiments, the feedback information includes: a first information set determined based on received power detected at the mobile device and associated with the BS device at the different training slots; and a second information set determined based on interference power detected at the mobile device from unassociated BS devices at the different training slots, wherein the unassociated BS devices are ones of the BS devices associated with different cells from the cell associated with the BS device, and wherein the unassociated base station devices and the base station device are included in a network.

The method also includes sharing, by the BS device, information between other ones of the BS devices in the network to facilitate interference management. The method also includes partitioning, by the BS device, the first information set into a first group in which the beam does not contribute to interference for other mobile devices and a second group in which the beam does contribute to the interference for the other ones of the mobile devices, wherein the partitioning is based on third information received from the other BS devices. The method also includes: determining, by the BS device, a first selected beam in the first group and determining a second selected beam in the second group; and selecting, by the BS device, based on a criterion, the first selected beam in the first group or the second selected beam in the second group as a beam for the BS device to transmit the signal.

In yet another embodiment, a method includes: transmitting, by a BS device comprising a processor and associated with a cell, to a mobile device, downlink information including pilot signals, wherein the transmitting is performed using fixed precoder at different training slots in a cell associated with the BS device; receiving, by the BS device using different combiners at the different training slots, the pilot signals transmitted from the mobile device in a cell associated with the BS device; and determining, by the BS device, a first information set based on received power from the mobile device at the different training slots and measuring interference power that a beam in the first information set suffers from out-of-cell unassociated mobile devices at the different training slots. The method also includes: partitioning, by the BS device, the first information set into a first group in which a first set of beams have no interference from the out-of-cell unassociated mobile devices and a second group in which a second set of beams have interference from the out-of-cell unassociated mobile devices; and determining, by the BS device, a first selected beam in the first group and determining a second selected beam in the second group. The method also includes selecting, by the BS device, based on a criterion, the first selected beam in the first group or the second selected beam in the second group as the beam for BS device to transmit the signal.

In yet another embodiment, a computer-readable medium is provided. The computer-readable medium stores computer-executable instructions that, in response to execution, cause a processor to perform operations. The operations include: determining, by BS device comprising a processor, a first information set based on received power from a mobile device at different training slots and measuring interference power that a beam in the first information set suffers from out-of-cell unassociated mobile devices at different training slots; and partitioning, by the BS device, the first information set into a first group in which a first set of beams have no interference from other mobile devices and a second group in which a second set of beams have interference from other mobile devices. The operations also include: determining, by the BS device, a first selected beam in the first group and determining a second selected beam in the second group; and selecting, by the BS device, based on a criterion, the first selected beam in the first group or the second selected beam in the second group as the beam for BS device to transmit the signal.

Toward the accomplishment of the foregoing and related ends, the one or more embodiments comprise the features hereinafter fully described and particularly pointed out in the claims. The following description and the annexed drawings set forth herein detail certain illustrative embodiments of the one or more embodiments. These embodiments can be indicative, however, of but a few of the various ways in which the principles of various embodiments can be employed and the described embodiments can be intended to include all such embodiments and their equivalents.

BRIEF DESCRIPTION OF THE DRAWINGS

FIG. 11 is a table illustrating the best-M-beams set including interference powers in a system facilitating interference management in a multi-cell and multi-user mmW cellular network according to a second embodiment described with reference to FIG. 9;

FIG. 13 is a table of example parameters and values for a simulation of interference management in an outdoor urban street multi-cell and multi-user mmW cellular network in accordance with the simulation described with reference to FIG. 12;

DETAILED DESCRIPTION

Figure 1:
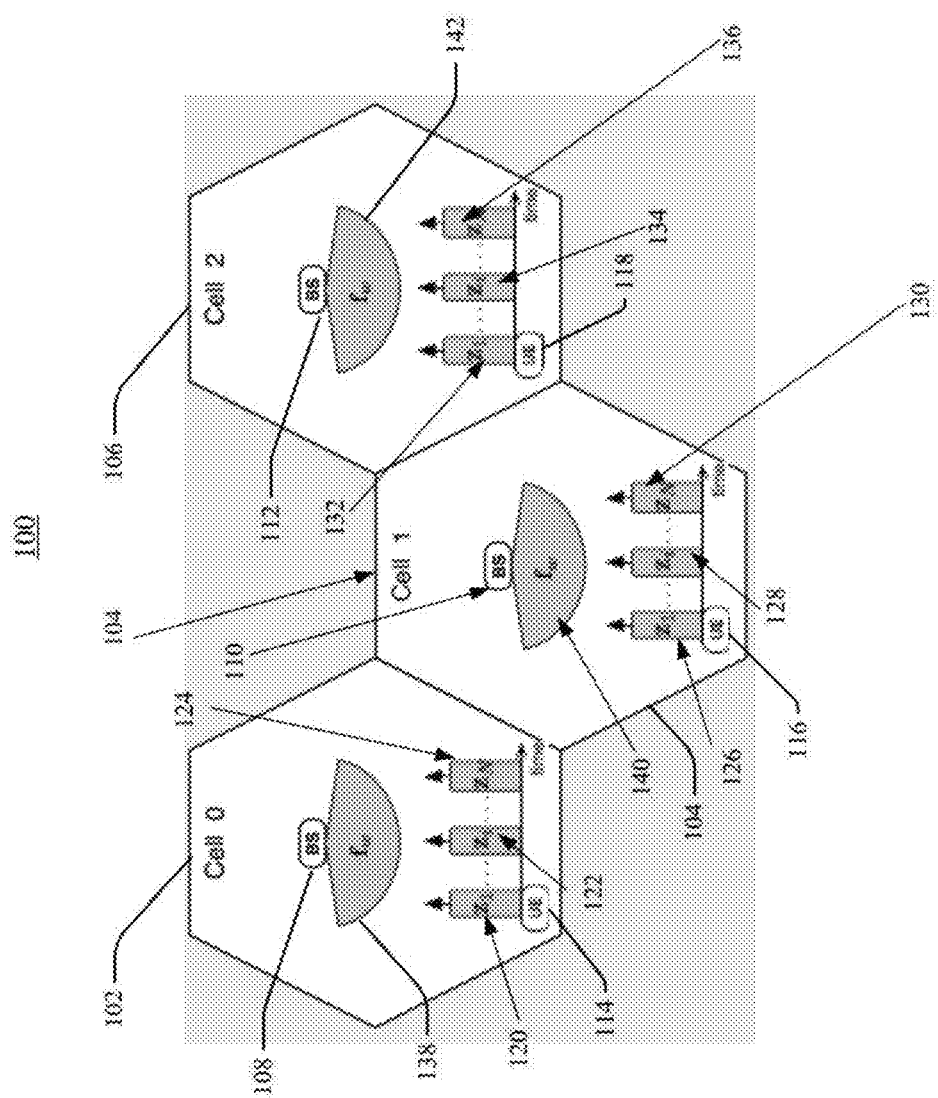
FIG. 1 is a block diagram illustrating uplink training in a system facilitating interference management in a multi-cell and multi-user mmW cellular network in accordance with a first embodiment of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. In other instances, well-known structures and devices is shown in block diagram form in order to facilitate describing one or more embodiments. By way of example, but not limitation, bit numbers, model numbers, resolution, signal identifiers and names, and/or component model numbers may be transmitted in describing or illustrating various embodiments. It may be evident, however, that such embodiments may be practiced without these specific details. Further, all such alternative embodiments that achieve the functionality of that described herein are envisaged and within the scope of the embodiments disclosed.

The mmW communication systems operate at very high frequency (e.g., 30 GHz to 300 GHz), which can result in the mmW link suffering more serious path loss than that for a microwave link. The small wavelength of mmW signals in addition to the developments in low power CMOS RF circuits facilitate the use of large numbers of miniaturized antennas. The large numbers of miniaturized antennas can be easily integrated at the mmW BS device and mobile device to provide sufficient array gain by forming a directional narrow beam using beamforming techniques. The directional narrow beams in mmW communication systems can overcome the severe path loss and provide reliable communication links. However, such can involve precisely aligning the directional narrow beams at the transmitter and receiver by finding the properly precoder (precoder is used to generate the directional narrow beams at the transmitter) and combiner (combiner is used to generate the directional narrow beams at the receiver) at transmitter and receiver respectively.

Furthermore, to provide reliable service to mobile devices in a given area, dense cell deployment is typically utilized to ensure that the distance between the mmW BS device and mobile device is in low orders-of-magnitude, thus avoiding or reducing the likelihood of serious path loss. The high density cell deployment can potentially increase the frequency efficiency and provide seamless coverage. However, dense cell deployment in which the BS devices emit highly directional narrow beams to the mobile devices could cause co-channel interference to the neighboring cells due to beam collision. The interference can significantly degrade system performance and corresponding quality of service of cellular communications using the mmW band. As such, there is a desire for interference management in multi-cell, multi-user mmW cellular networks.

In one or more embodiments described herein, adaptive beam selection is employed to facilitate interference management in multi-cell, multi-user mmW networks. One embodiment of interference management described herein includes a feedback approach in which the BS device collects information from associated mobile devices in the cell operated by the BS device and from other BS devices associated with other cells for interference management. The mobile device feeds back the best beams set and the worst interference beams set to the mobile device serving BS device and the worst interference beams set received by the BS device is shared amongst other BS devices. A beam selection criterion is provided, and described in greater detail below with reference to FIGS. 7 and 8, that selects a beam for use by the BS device to transmit the signals to the mobile device with limited/no interference. A beam (e.g., a directional narrow beam) that meets particular criterion is selected at the BS device during the beam alignment stage. The BS device selects the directional narrow beam that establishes a reliable channel, while reducing interference to the mobile devices in neighboring cells. In some embodiments, each BS device can employ this approach to reduce interference for an overall improved multi-user, multi-cell system performance.

Another embodiment of interference management described herein avoids feedback overhead by leveraging the channel reciprocity in a time division duplex (TDD) setting. In the embodiment, the BS device measures the uplink desired power from associated mobile devices in the cell operated by the BS device and uplink interference from unassociated mobile devices in neighbor cells (or, in some embodiments, in one or more neighbor cells) to determine the beam using the beam selection criterion for BS devices for downlink transmission.

One or more embodiments described herein can reduce interference in multi-cell and multi-user mmW cellular networks thereby improving quality of the cellular networks as well as potentially increasing system capacity. These embodiments can provide such improvements for dense, urban outdoor environments. Further, in some embodiments, feedback cost is reduced by utilizing channel reciprocity of TDD for the interference management.

FIG. 1 is a block diagram illustrating uplink training in a system facilitating interference management in a multi-cell and multi-user mmW cellular network in accordance with the first embodiment of the present invention. System 100 includes one or more cells (e.g., cells 102, 104, 106), one or more BS devices (e.g., BS devices 108, 110, 112) that facilitate communication within the one or more cells 102, 104, 106 and one or more mobile devices (e.g., mobile devices 114, 116, 118) configured to communicate in the one or more cells 102, 104, 106 with respective BS devices 108, 110, 112. In some embodiments, the BS devices 108, 110, 112 are mmW BS devices. In some embodiments, the cells 102, 104, 106 include coverage areas for dense, urban outdoor environments.

The mobile devices 114, 116, 118 are configured to communicate by using different narrow beam precoders 120, 122, 124, 126, 128, 130, 132, 134, 136 at each training slot (or, in some embodiments, one or more training slots) and the BS devices 108, 110, 112, are configured to communicate by using wide beams precoders 138, 140, 142 to facilitate interference management over cells 102, 104, 106 according to the first embodiment. As used herein, the term "training slot" means a segment of time during which a signal can be transmitted.

Each narrow beam (or, in some embodiments, one or more narrow beams) formed at the antenna of mobile devices 114, 116, 118 by beamforming techniques with precoders 120, 122, 124, 126, 128, 130, 132, 134, 136 have a unique space signature and enable the mobile device 114, 116, 118 to transmit/receive signals to/from a certain direction. The wide beam formed at the antenna of BS devices 108, 110, 112 with precoders 138, 140, 142 can cover a wide area and enable the BS devices 108, 110, 112 to transmit/receive signals to/from all possible (or, in some embodiments, one or more different) directions.

In particular, as shown in FIG. 1, uplink training can be performed to determine, by BS devices 108, 110, 112, a desirable (or, in some embodiments, the best) narrow beam precoder for a mobile device for interference management. By way of example, but not limitation, uplink training can include the mobile devices 114, 116, 118 transmitting one or more of pilot signals (not shown) to the respective BS devices 108, 110, 112 by sequentially using narrow beam precoders $z_i \in \{z_1, z_2, \ldots, z_N\}$ 120, 122, 124, 126, 128, 130,

132, 134, 136. The narrow beam precoder $z_i$ is taken from codebook $\{z_1, z_2, \ldots, z_N\}$, which can be precomputed and stored at a mobile device. The transmission of each narrow beam (or, in some embodiments, one or more narrow beams) can result in the pilot signals being transmitted to respective unique directions.

By way of example, but not limitation, mobile device 114 can transmit pilot signals to BS device 108 by sequentially using narrow beams precoders 120, 122, 124; mobile device 116 can transmit pilot signals to BS device 110 by sequentially using narrow beams precoder 126, 128, 130; mobile device 118 can transmit pilot signals to BS device 112 by sequentially using narrow beams precoder 132, 134, 136.

In some embodiments, pilot signals at mobile device 114, for example, are transmitted with narrow beam precoders 120, 122, 124, and the BS device 108 is employed to receive and demodulate the signal from the mobile device 114 associated with the BS device 108. The pilot signals transmitted at the N training slots at mobile device 114 can be received at the BS device 108. The BS device 108 can detect the received power and determine channel quality information (e.g., received signal strength indicator (RSSI) and/or the signal-to-noise ratio (SNR)) at each training slot (or, in some embodiments, one or more training slots).

In some embodiments, one or more of (or, in some embodiments, each of) BS devices 108, 110, 112 uses a wide beam precoder, e.g., $f_w$ (e.g., wide beam precoders 138, 140, 142) in each training slot (or, in some embodiments, one or more training slots) as shown in FIG. 1 to receive the signals transmitted by associated mobile devices 114, 116, 118. The wide beam precoder, e.g., $f_w$, is taken from codebook i, which is precomputed and stored at BS device 108, 110, 112. One or more (or, in some embodiments, each of) mobile device 114, 116, 118 simultaneously implement the uplink training. After a defined number (e.g., N) times of training, one or more of (or, in some embodiments, each of) BS devices 108, 110, 112 measures the received power at each training slot (or, in some embodiments, one or more training slots) and finds the index of the narrow beam precoder that has the highest received power, e.g., i*, j*, k*, for the mobile device that transmitted the pilot signals to the BS device. By way of example, but not limitation, BS device 108 determines the best precoder index for served mobile device 114, BS device 110 determines the best precoder index for served mobile device 116 and BS device 112 determines the best precoder index for served mobile device 118.

Figure 2:
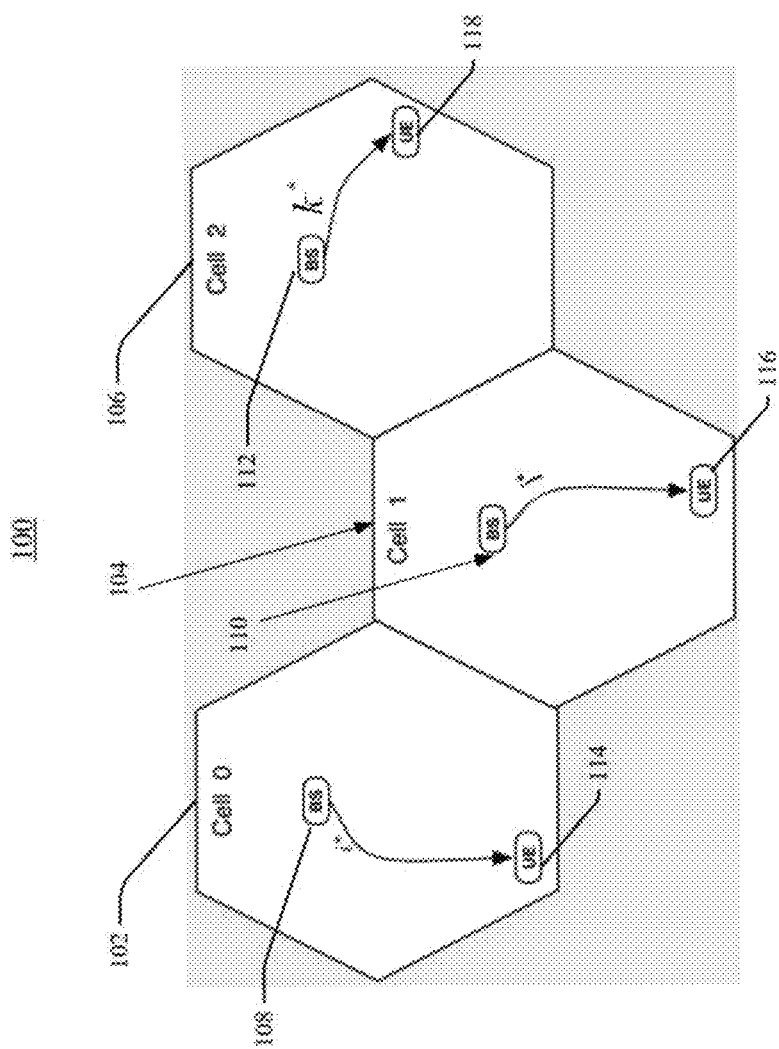
FIG. 2 is a block diagram illustrating downlink notification in a system facilitating interference management in a multi-cell and multi-user mmW cellular network in accordance with the first embodiment of the present invention described with reference to FIG. 1.

FIG. 2 is a block diagram illustrating downlink notification in a system facilitating interference management in a multi-cell and multi-user mmW cellular network in accordance with the first embodiment of the present invention described with reference to FIG. 1. Repetitive description of like elements employed in other embodiments described herein is omitted for sake of brevity.

The downlink notification stage of the first embodiment of interference management can be performed after the uplink training is performed and/or performed based on information accessed from the result of previous uplink training. During downlink notification, information indicative (e.g., i*, j*, k* described with reference to FIG. 2) of the selected (e.g., best or desired) precoder index for each mobile device can be provided by the respective serving BS device after the uplink training has been performed. In some embodiments, the notification can be transmitted from BS devices to its served mobile devices via microwave channel or secured mmW sub-channel in a multi-cell and multi-user mmW channel).

Figures 3, 4:
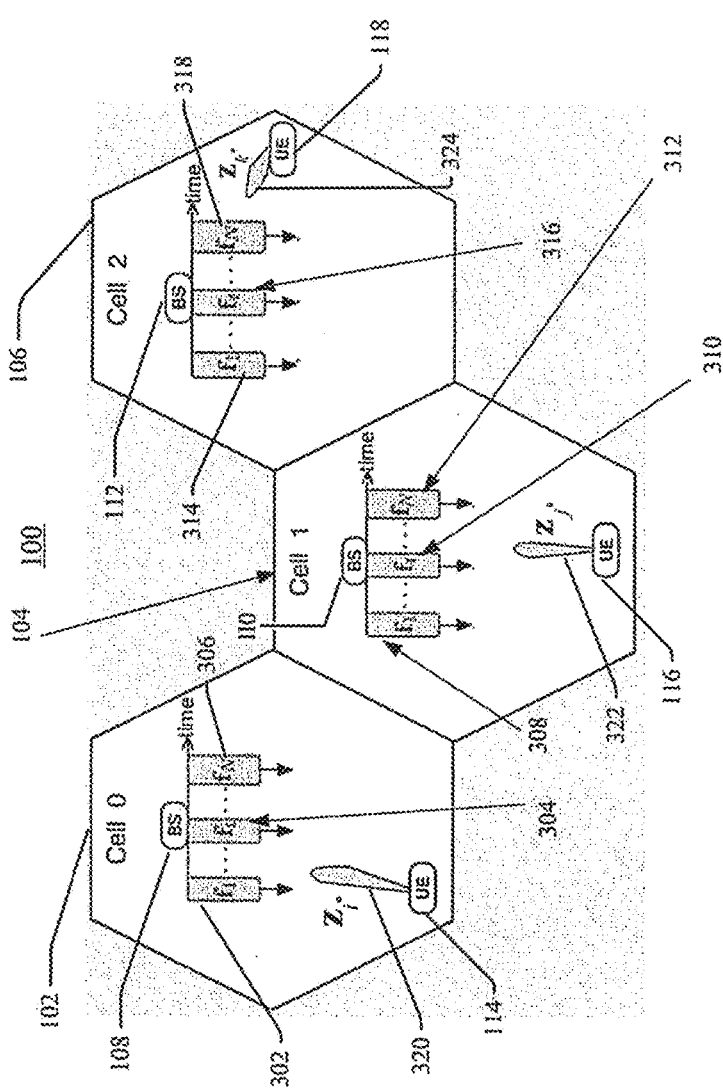
FIG. 3 is a block diagram illustrating downlink training in a system facilitating interference management in a multi-cell and multi-user mmW cellular network in accordance with the first embodiment of the present invention described with reference to FIG. 1.
FIG. 4 is a set of tables that illustrate the best-M-beams set and the worst-L-interference-beams set determined at mobile device from downlink training in FIG. 3 for the system facilitating interference management in a multi-cell and multi-user mmW cellular network in accordance with the first embodiment of the present invention described with reference to FIG. 1.

FIG. 3 is a block diagram illustrating downlink training in a system facilitating interference management in a multi-cell and multi-user mmW cellular network in accordance with the first embodiment of the present invention described with reference to FIG. 1. FIG. 4 is a set of tables that illustrate the best-M-beams set M and the worst-L-interference-beams set, L, determined by mobile device from downlink training in FIG. 3 for the system facilitating interference management in a multi-cell and multi-user mmW cellular network in accordance with the first embodiment of the present invention described with reference to FIG. 1. Repetitive description of like elements employed in other embodiments described herein is omitted for sake of brevity.

During downlink training, one or more (or, in some embodiments, all) BS devices 108, 110, 112 can synchronously broadcast pilot signals by sequentially using the narrow beam precoder $f_i \in \{f_1, f_2, \ldots, f_N\}$ 302, 304, 306, 308, 310, 312, 314, 316, 318. Each (or, in some embodiments, one or more) mobile devices 114, 116, 118 can take the selected (or, in some embodiments, best or desired) precoder $z_i, z_j, z_k$. 320, 322, 324 identified during downlink notification as combiner to receive signals during the downlink training as shown in FIG. 3. Noting that combiner and precoder are two names for the same thing. If device uses it to receive signal, we name it as combiner. If device uses it to transmit the signal, we name it as precoder.

During the N times downlink training (or, in some embodiments, during one or more of the N times downlink training), mobile devices 114, 116, 118 can detect the received power at each training slot (or, in some embodiments, one or more training slots) and find the top M values of the received power. If all of the top M values are larger than or equal to a given threshold, the top M values and the corresponding precoder index of the received power in the top M values are collected, by mobile devices 114, 116, 118, to construct the best-M-beams set M shown as FIG. 4. If some of the top M values are smaller than a given threshold, mobile devices 114, 116, 118 can associate the received power whose value is larger than or equal to the given threshold in the top M values with respective precoder index to construct the best-M-beams set M shown as FIG. 4. If all of the top M values are smaller than the given threshold, the best-M-beams set M for mobile devices 114, 116, 118 is empty. By way of example, but not limitation, mobile device 114 can construct a best-M-beams set, M for serving BS device 108. Mobile device 116 can construct a best-M-beams set for serving BS device 110. Mobile device 118 can construct a best-M-beams set for serving BS device 112. In various embodiments, the best-M-beams set can be empty or a set of one or more beams.

Each (or, in some embodiments, one or more of) mobile devices 114, 116, 118 can also detect the downlink interference power from unassociated BS devices in other cells 102, 104, 106 at each training slot (or, in some embodiments, one or more training slots) and find the top L values of the interference power. If all of the top L values are larger than or equal to a given threshold, the top L values, the corresponding precoder index of the top L values, and the corresponding cell identity (e.g., cell 102, cell 104) of the precoder are collected, by mobile devices 114, 116, 118, to construct a worst-L-interference-beam set L as FIG. 4. If some of the top L values are smaller than a given threshold, mobile devices 114, 116, 118 can associate the interference powers whose values are larger than or equal to the given threshold in the top L values with respective precoder index and corresponding cell identity (e.g., cell 102, cell 104) to construct the worst-L-interference-beam set L shown as FIG. 4. If all of the top L values are smaller than the given threshold, the worst-L-interference-beam set L for mobile devices 114, 116, 118 is empty. By way of example, but not limitation, mobile device 114 can construct a worst-L-interference-beam set L for serving BS device 108. Mobile device 116 can construct a worst-L-interference-beam set L for serving BS device 110. Mobile device 118 can construct a best-M-beams set for serving BS device 112. In various embodiments, the worst-L-interference-beams set L can be empty or a set of one or more beams.

Figures 5, 6:
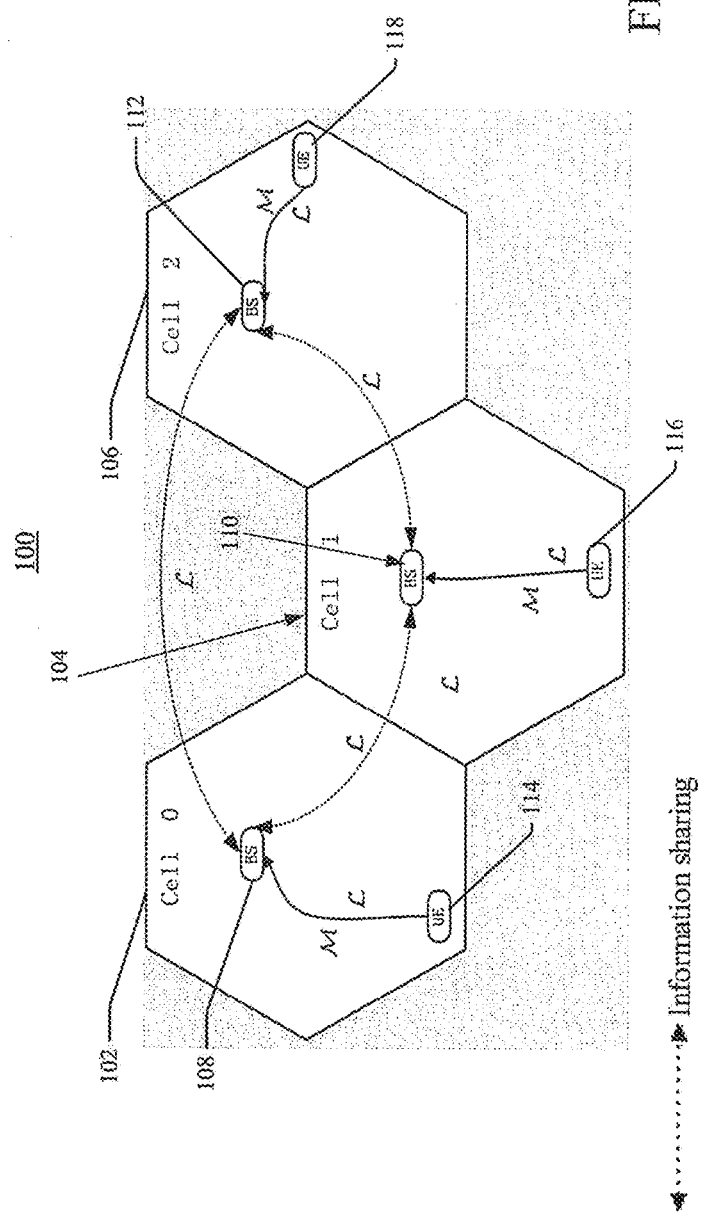
FIG. 5 is a block diagram of information feedback by mobile devices and information exchange among BS devices in a system facilitating interference management in a multi-cell and multi-user mmW cellular network in accordance with the first embodiment of the present invention described with reference to FIG. 1.
FIG. 6 is a table illustrating the best-M-beams set including interference power in a system facilitating interference management in a multi-cell and multi-user mmW cellular network in accordance with the first embodiment of the present invention described with reference to FIG. 1.

FIG. 5 is a block diagram of information feedback by mobile devices and information exchange among BS devices in a system facilitating interference management in a multi-cell and multi-user mmW cellular network in accordance with the first embodiment of the present invention described with reference to FIG. 1. Repetitive description of like elements employed in other embodiments described herein is omitted for sake of brevity.

During information feedback, mobile devices 114, 116, 118 feed back to respective serving BS devices 108, 110, 112, the set M and L determined by the mobile devices 114, 116, 118. For example, mobile device 114 feeds back to BS device 108 the set M and L determined by the mobile device 114; while mobile device 116 feeds back to BS device 110 the set M and L determined by the mobile device 116. If M is empty, mobile device 114, 116, 118 does not feed back information to serving BS device 108, 110, 112, and if M has elements and L is empty, mobile device 114, 116, 118 merely feeds back M to serving BS device 108, 110, 112. The worst-L-interference-beam set L received at each BS device can be shared among the BS devices in the network as shown in FIG. 5. In some embodiments, the worst-L-interference-beam set L received at each BS device can be shared among one or more other BS devices in the network.

FIG. 6 is a table illustrating the best-M-beams set including interference power in a system facilitating interference management in a multi-cell and multi-user mmW cellular network in accordance with the first embodiment of the present invention described with reference to FIG. 1. Repetitive description of like elements employed in other embodiments described herein is omitted for sake of brevity.

Based on the worst-L-interference-beam set L received at each BS device from another BS device, each (or, in some embodiments, one or more) BS devices checks whether the beams in the received best-M-beams set M has been reported by unassociated (e.g., out of cell) mobile devices in the worst-L-interference beam set L as interferer.

If a beam (e.g., which is associated with a specific precoder) in the best-M-beams set is not reported as an interfering beam, the BS device that has received the best-M-beams set determines the amount of interference power that the particular beam in the best-M-beams set generated to the unassociated (e.g., out of cell) mobile devices to be zero. Otherwise, if a beam in the best-M-beams set is reported as an interferer, the BS device that has received the best-M-beams set determines that the amount of interference power that the beam generated to the unassociated (e.g., out of cell) mobile devices is the summation of the received powers of the beam in L. As shown in FIG. 6, the interference power for each beam in the best-beam-set M can be associated with (e.g., appended to) the corresponding beam in the original set, M.

Figure 7:
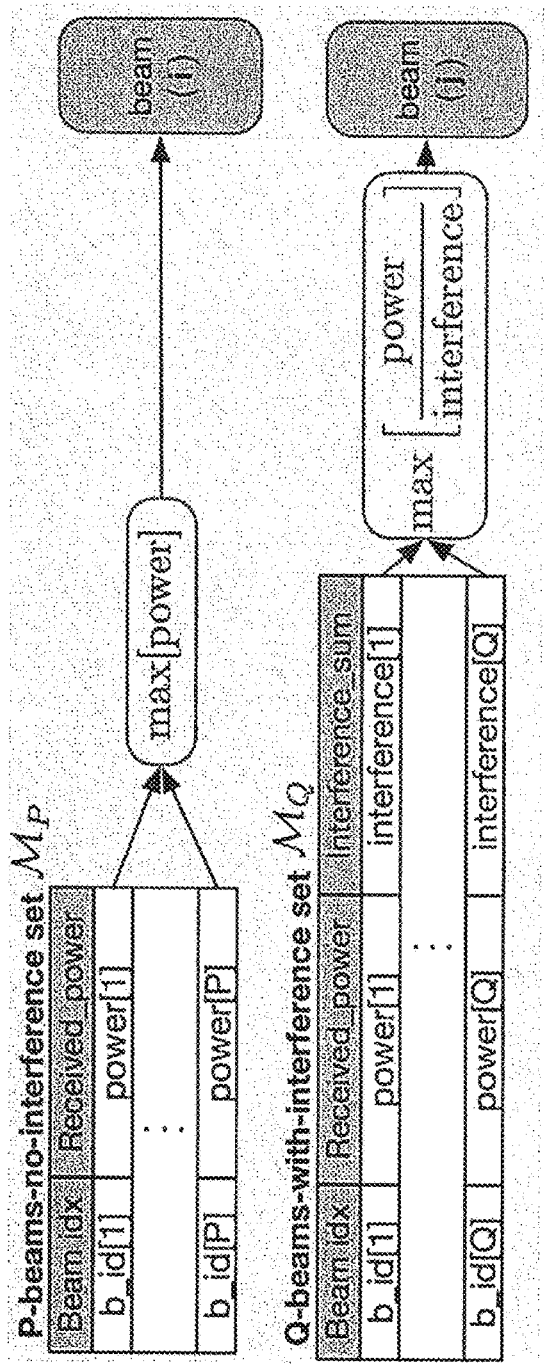
FIG. 7 is a block diagram illustrating beam selection in a system facilitating interference management in a multi-cell and multi-user mmW cellular network in accordance with the first embodiment of the present invention described with reference to FIG. 1.
Figure 8:
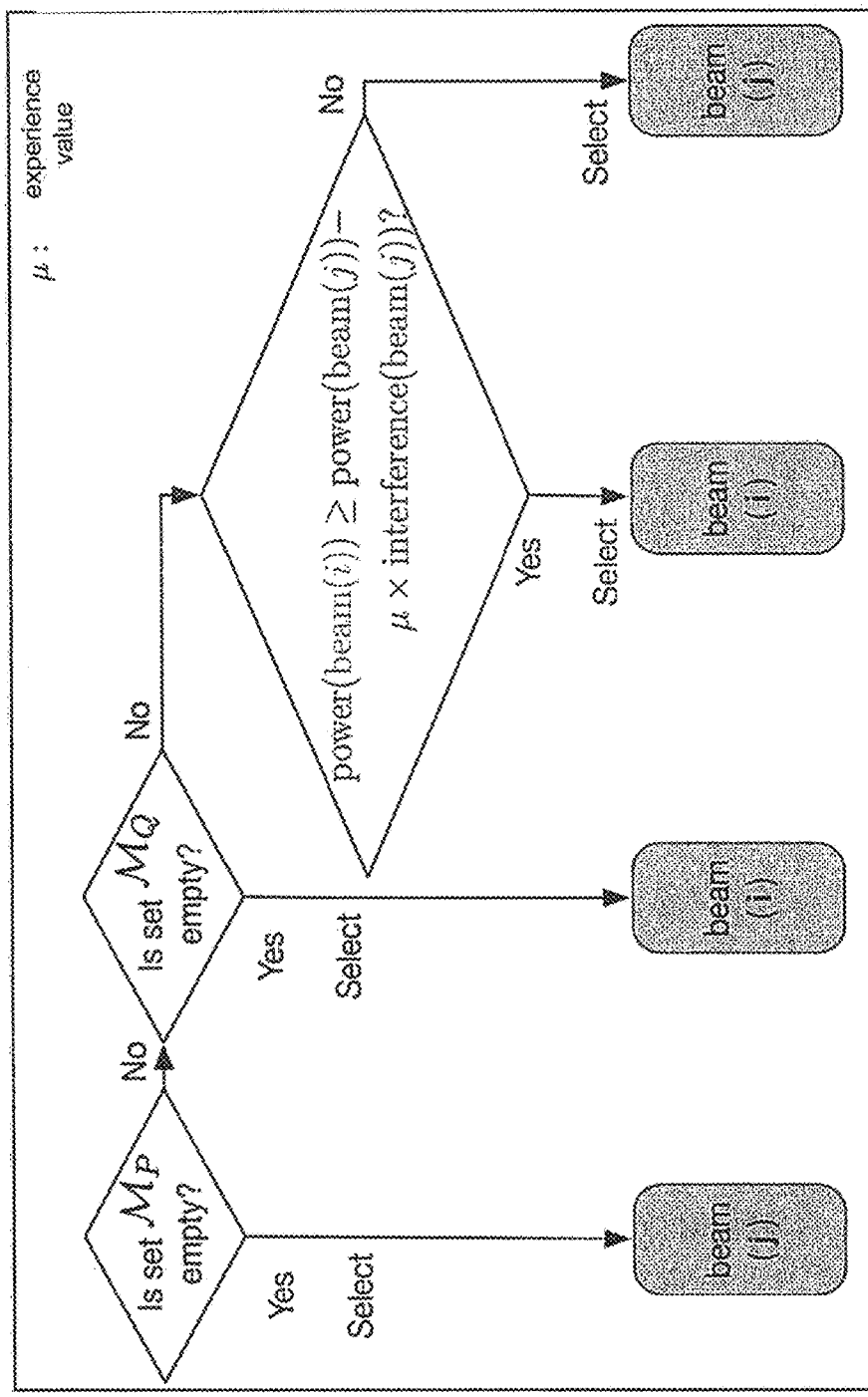
FIG. 8 is a flow diagram of beam selection in a system facilitating interference management in a multi-cell and multi-user mmW cellular network in accordance with the first embodiment of the present invention described with reference to FIG. 1.

FIG. 7 is a block diagram illustrating beam selection in a system facilitating interference management in a multi-cell and multi-user mmW cellular network in accordance with the first embodiment of the present invention described with reference to FIG. 1. FIG. 8 is a flow diagram of desired beam selection in a system facilitating interference management in a multi-cell and multi-user mmW cellular network in accordance with the first embodiment of the present invention described with reference to FIG. 1. Repetitive description of like elements employed in other embodiments described herein is omitted for sake of brevity.

In some embodiments, the selected (in some embodiments, optimal) narrow beam precoder can be the precoder that can form specific directional narrow beam at antenna to radiate or receive greater desired power to the mobile device and/or provides less interference (or, in some embodiments, the least amount of interference) to other mobile devices in other cells. As such, the selected narrow beam precoder can be the precoder identified in the first embodiment (and later in the second embodiment) that the use of which by a BS device facilitates interference management in the multi-cell and multi-user mmW cellular networks. Different BS devices can have different selected (e.g., optimal) narrow beam precoders based on the operations described with reference to FIGS. 1-8.

Turning to FIG. 7, during beam selection, each BS device, as shown in FIG. 7, can partition the best-M-beams set M including interference into a P-beams-no-interference set $M_P$ and a Q-beams-with-interference set $M_Q$, where $M_P \cup M_Q = M$, $M_P \cap M_Q = \emptyset$ (the union of $M_P$ and $M_Q$ is M, the best-M-beams set, the intersection of $M_P$ and $M_Q$ is $\emptyset$). In particular, each BS device (or, in some embodiments, one or more BS devices) can determine which candidate beams of the best-M-beam set provided no interference to other mobile devices in other cells, which is the P-beams-no-interference set $M_P$, and which candidate beams were indicated as interfering beams to other mobile devices in other cells, which is the Q-beams-with-interference set $M_Q$. Since the mobile device merely feeds back the best-M-beams set M that includes element, it is impossible that both $M_P$ and $M_Q$ are empty.

As shown in FIG. 7, the beam having the maximum received power of those beams in the P-beams-with-interference set can be determined (e.g., beam(i) in FIG. 7). The beam having the maximum power/interference ratio of those beams in the Q-beams-with-interference set can also be determined (e.g., beam(j) in FIG. 7).

Beam selection can be implemented based on the flow chart shown in FIG. 8. As shown in FIG. 8, for the (e.g., optimal, desired) beam selection, the following steps can be employed. The method determines whether the P-beams-no-interference set is empty. If the set of P-beams-no-interference set is empty, the beam(j) can be selected as the desire beam.

If the set of P-beams-no-interference set is not empty, a determination is made as to whether the set of Q-beams-with-interference set is empty. If the determination is made that the set of Q-beams-with-interference set is empty, the beam(i) can be selected as the desire beam.

If a determination is made that the set of Q-beams-with-interference set is not empty, a determination can be made as to whether the power of beam(i) is greater than or equal to the power of beam(j) minus the product of μ and interference power of beam(j).

If a determination is made that the power of beam(i) is greater than or equal to the power of beam(j) minus the product of μ and interference power of beam(j), beam(i) can be selected as the desire beam. If a determination is made that the power of beam(i) is smaller than the power of beam(j) minus the product of μ and interference power of beam(j), the beam(j) can be selected as the desire beam. In the embodiment described, μ is an experience value.

Accordingly, the first embodiment includes an inter-cell interference management scheme in multi-cell and multi-user mmW cellular networks with the purpose of mitigating co-channel interference and enhancing system capacity. The first embodiment includes selecting the directional narrow beam at the BS device during the beam alignment stage to suppress the co-channel interference caused by beam collision. In this embodiment, the mobile device can feed back the best-M-beams set and the worst-L-interference-beams set to its serving BS device. The feedback information is shared among BSs devices. And based on the information, each BS device implements the proposed beam selection criterion to select the directional narrow beam that establishes a reliable link, while reducing interference to the mobile devices in neighboring cells.

Figure 9:
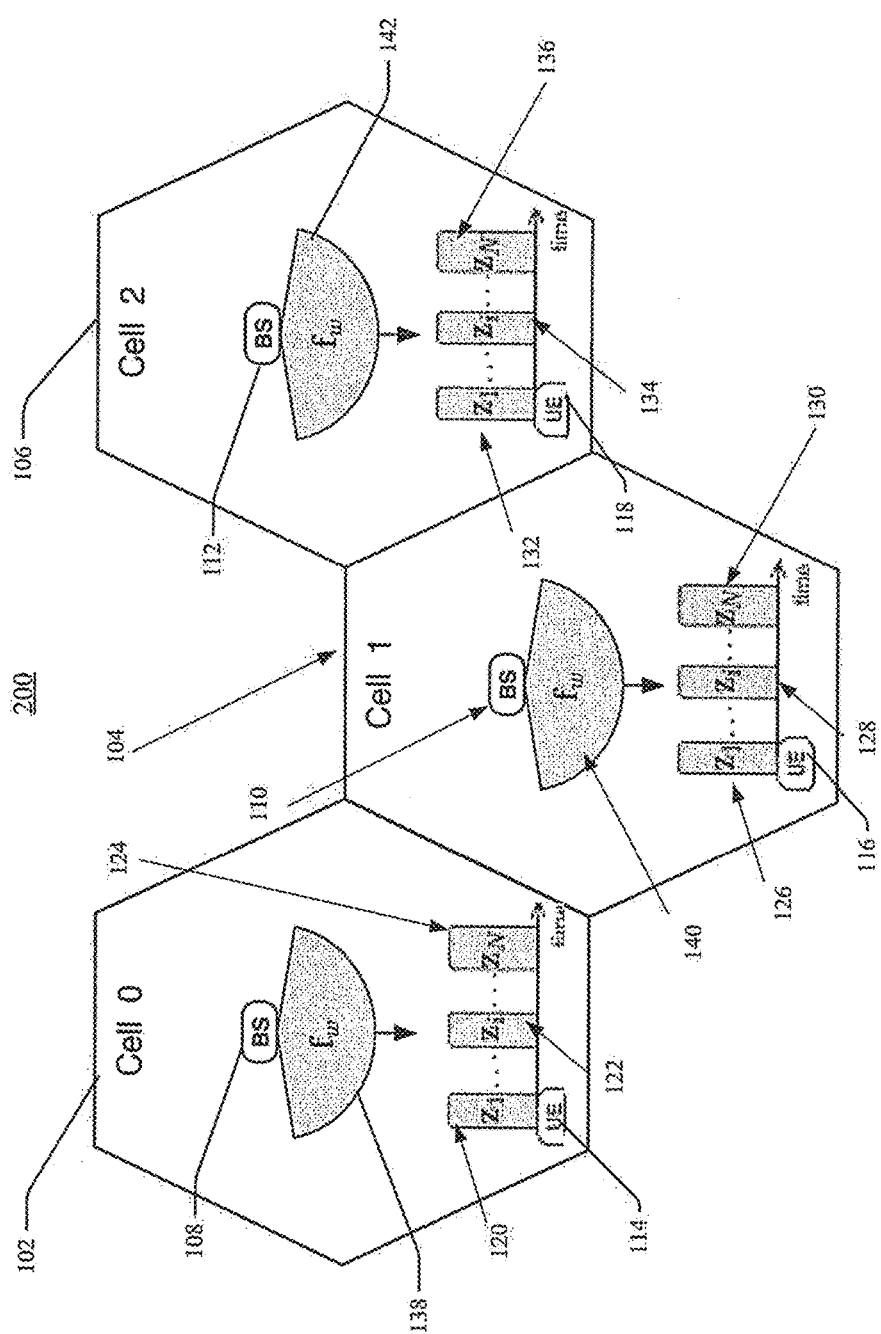
FIG. 9 is a block diagram illustrating downlink training in a system facilitating interference management in a multi-cell and multi-user mmW cellular network according to a second embodiment of the present invention.

FIG. 9 is a block diagram illustrating downlink training in a system facilitating interference management in a multi-cell and multi-user mmW cellular network according to a second embodiment of the present invention. Repetitive description of like elements employed in other embodiments described herein is omitted for sake of brevity.

In this embodiment, the mobile devices 114, 116, 118 and the BS devices 108, 110, 112 communicate according to a TDD scheme in which the uplink channel from the mobile device (e.g., mobile device 114) to the BS device (e.g., BS device 108) is separated from the downlink channel from the BS device (e.g., BS device 108) to the mobile device (e.g., mobile device 114) by the allocation of different time slots but the same frequency band. The downlink channel $H_{down}$ is the conjugate transpose of uplink channel $H_{up}$, e.g., $H_{down}=H^*_{up}$. Therefore, for a certain communication link where transmitter using precoder f and receiver using precoder z, the uplink detected signal $y_{up}=f^*H_{up}zx_{up}$ can be mapped to downlink detected signal $$y_{down} = z^* H_{down} f x_{down} = (f^* H_{up} z)^* x_{down} = \frac{x_{down}}{x_{up}} y_{up},$$

where the $x_{up}$ and $x_{down}$ are the uplink and downlink transmitted signals, respectively. Then, BS devices can detect the uplink power and uplink interference at each (or, in some embodiments, one or more) uplink training slot and use the information (e.g., uplink power and uplink interference) for downlink interference management by one or more (or, in some embodiments, each of BS devices 108, 110, 112). Contrary to the first embodiment discussed with reference to FIGS. 1-8, this second embodiment can be implemented without feedback, thus reducing or eliminating feedback overhead.

This embodiment, which is described with reference to FIGS. 9, 10, 11, 7 and 8, includes downlink training, uplink training, interference measurement, and beam selection. For example, the first step in the embodiment is to perform downlink training. As shown in FIG. 9, during downlink training, one or more of (or, in some embodiments, each of) BS devices 108, 110, 112 can transmit with wide beam precoder (e.g., $f_w$) one or more pilot signals to respective mobile devices 114, 116, 118. The wide beam precoder (e.g., $f_w$) is picked from codebook i that is precomputed and stored in BS device.

The mobile devices 114, 116, 118 can receive the pilot signals by sequentially using narrow beam combiner $z_i \in \{z_1, z_2, \ldots, z_N\}$ 120, 122, 124, 126, 128, 130, 132, 134, 136 in each training slot (or, in some embodiments, one or more training slots) as shown in FIG. 9. The narrow beam combiner (e.g., $z_i$) is picked from codebook i, which is precomputed and stored in the mobile device. After N times training, each (or, in some embodiments, one or more of) mobile devices 114, 116, 118 can detect the received power at each training slot, determine the best beam combiner $z_{i*}$, $z_{j*}$, $z_{k*}$ based on the received power at each training slot (or, in some embodiments, one or more training slots), and store the index of the combiner e.g., $i^*$, $j^*$, $k^*$. In some embodiments, a mobile device selects a beam combiner (e.g., a best beam combiner in some embodiments) resulting in the highest received power at the mobile device.

Figure 10:
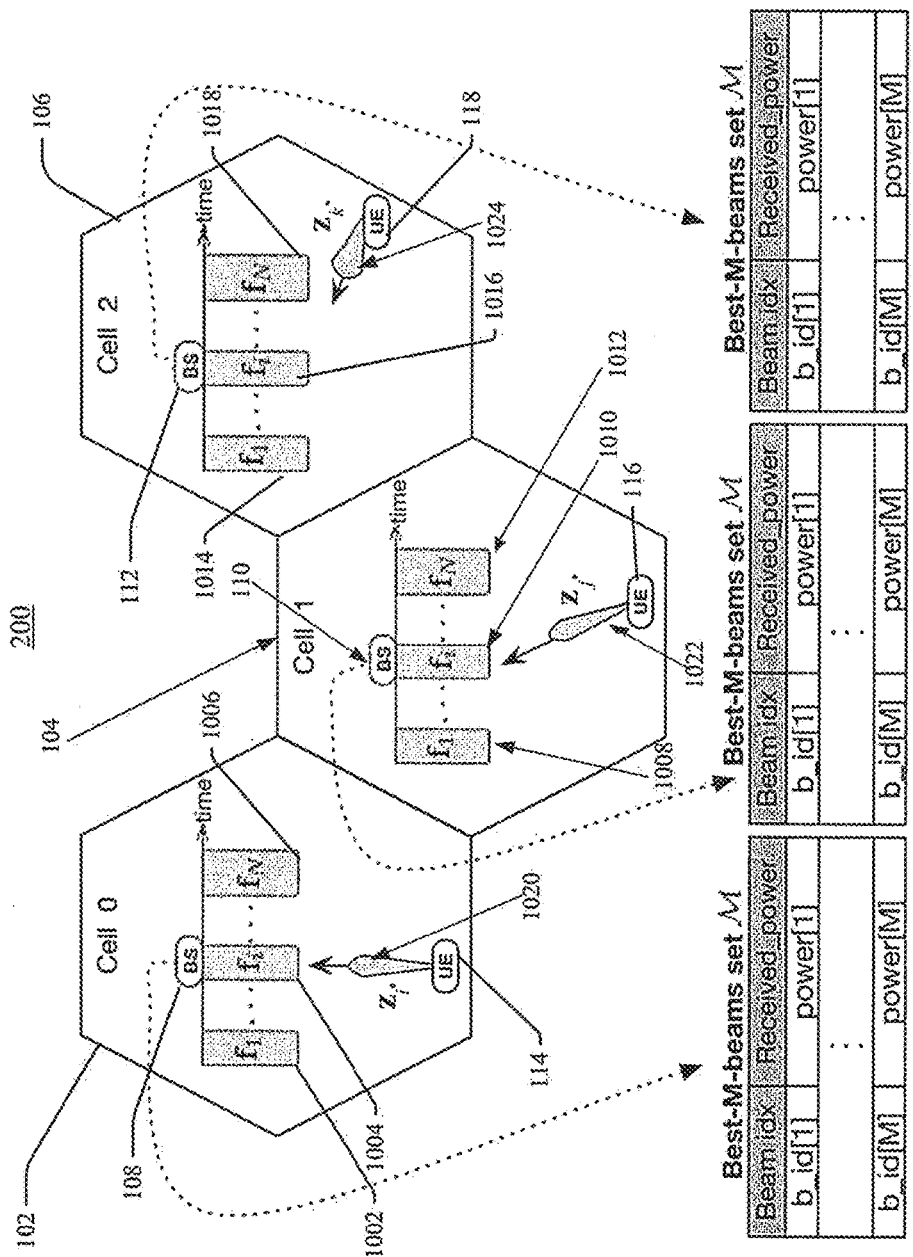
FIG. 10 is a block diagram illustrating uplink training in a system facilitating interference management in a multi-cell and multi-user mmW cellular network according to a second embodiment of the present invention described with reference to FIG. 9.

FIG. 10 is a block diagram illustrating uplink training in a system facilitating interference management in a multi-cell and multi-user mmW cellular network according to a second embodiment of the present invention described with reference to FIG. 9. Repetitive description of like elements employed in other embodiments described herein is omitted for sake of brevity.

In some embodiments, after downlink training is performed, uplink training is performed. In other embodiments, the mobile devices 114, 116, 118 can access or otherwise determine information previously identified based on previous downlink training (e.g., can access or otherwise determine the best beam combiner).

During uplink training, mobile devices 114, 116, 118 can take the selected (e.g., best, desired) beam combiner $z_{i*}$, $z_{j*}$, $z_{k*}$ 1020, 1022, 1024 (e.g., with the beam determined to be the selected beam by the mobile device) as the precoder to transmit pilot signals to respective BS devices 108, 110, 112. BS devices 108, 110, 112 can receive the pilot signals by sequentially using the narrow beam combiner $f_i \in \{f_1, f_2, \ldots, f_N\}$ (e.g., BS device 110 can employ narrow beam combiners 1002, 1004, 1006; BS device 112 can employ narrow beam combiners 1008, 1010, 1012; BS device 112 can employ narrow beam combiners 1014, 1016, 1018) as shown in FIG. 10. The narrow beam combiner (e.g., $f_i$) is picked from codebook i, which is pre-computed and stored in BS device 108, 110, 112.

During the N times uplink training, one or more of BS devices 108, 110, 112 can detect the received power at each training slot (or, in some embodiments, one or more training slots) and find the top M values of the received power. If all of the top M values are larger than or equal to a given threshold, the top M values and the corresponding precoder index of the received power in the top M values are collected, by BS devices 108, 110, 112, to construct the best-M-beams set M shown as FIG. 10. If some of the top M values are smaller than a given threshold, BS devices 108, 110, 112 can associate the received power in the top M values whose value is larger than or equal to the given threshold with respective precoder index to construct the best-M-beams set M shown as FIG. 10. If all of the top M values are smaller than a given threshold, BS devices 108, 110, 112 do not construct the beam M beams set M.

During N times uplink training, one or more of BS devices 108, 110, 112 can also measure the uplink interference from unassociated out-of-cell mobile devices 114, 116, 118 at each training slot (or, in some embodiments, one or more training slots). FIG. 11 is a table illustrating the best-M-beams set including interference powers in a system facilitating interference management in a multi-cell and multi-user mmW cellular network according to a second embodiment described with reference to FIG. 9. Repetitive description of like elements employed in other embodiments described herein is omitted for sake of brevity.

With interference power measurement, BS devices 108, 110, 112 can determine the uplink channel interference power from unassociated out-of-cell mobile devices at each training slot (or, in some embodiments, one or more training slots). These interference powers can be stored and/or otherwise appended to or associated with corresponding beams in M as shown in FIG. 11. For beam selection, based on the channel reciprocity in TDD mode, the BS device can then employ the uplink power and uplink channel interference for each beam (or, in some embodiments, one or more beams) in M as the available information to determine the (e.g., optimal, desired) narrow beam at BS devices for downlink transmission. Due to the channel reciprocity in TDD system, the received signals, at the uplink, can be mapped into the downlink signal. Therefore, the beam selected based on the uplink information can also be employed for downlink transmission. The beam selection criterion, which can be the same criterion shown and described with reference to FIGS. 7 and 8, can be employed to determine the narrow beam selected at the BS device. The selected narrow beam can be the selected (e.g., optimal, desired) beam noted in FIG. 8 in some embodiments.

Accordingly, the second embodiment includes an inter-cell interference management scheme in multi-cell and multi-user mmW cellular networks with the purpose of mitigating co-channel interference and enhancing system capacity. In this embodiment, to reduce or eliminate feedback overhead, the channel reciprocity in a TDD setting is leveraged to use the measured uplink interference information for downlink interference management.

Figure 12:
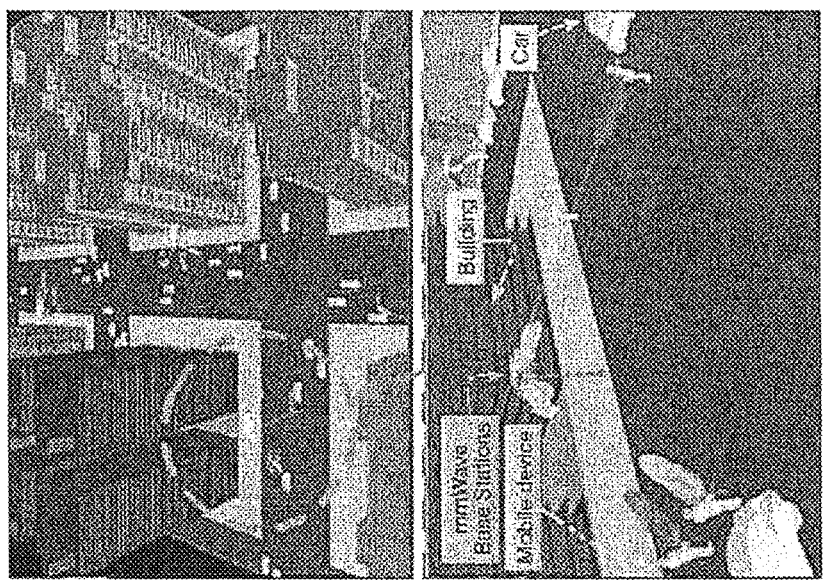
FIG. 12 illustrates an outdoor urban street multi-cell and multi-user mmW cellular network for which interference management is simulated in accordance with the first or second embodiments of the present invention.

FIG. 12 illustrates an outdoor urban street multi-cell and multi-user mmW cellular network for which interference management is simulated in accordance with the first or second embodiments of the present invention. FIG. 13 is a table of example parameters and values for a simulation of interference management in an outdoor urban street multi-cell and multi-user mmW cellular network in accordance with the simulation described with reference to FIG. 12. Repetitive description of like elements employed in other embodiments described herein is omitted for sake of brevity.

Since mmW cellular networks are expected to be deployed in urban outdoor environments where there exists numerous mobile devices and vehicles, the simulation and simulation results provided and described with reference to FIGS. 12, 13, 14 and 15 are of significance in assessing the embodiments in the invention. In particular, the simulation shows the results of interference management according to the first and second embodiments described herein relative to cases in which interference management is not employed. Substantial improvements in SINR and spectrum efficiency are shown employing the first and/or second embodiments of interference management.

The simulation considers the outdoor urban street multi-cell and multiuser mmW cellular network, which covers an area including buildings and moving cars, as shown in FIG. 12. In the simulation, six-sector BS devices are deployed on lampposts. Each sector covers 60° in azimuth and serves one mobile device located in the coverage area of the BS device. In the simulation, the Monte Carlo method is employed in which each mobile device is randomly deployed in the mobile device served sector coverage area at each snapshot.

In this simulation, the downlink transmission is considered, and the simulation parameters and values used are those shown in FIG. 13. It is noted that U[a,b] denotes the uniform distribution between the range [a, b].

Figure 14:
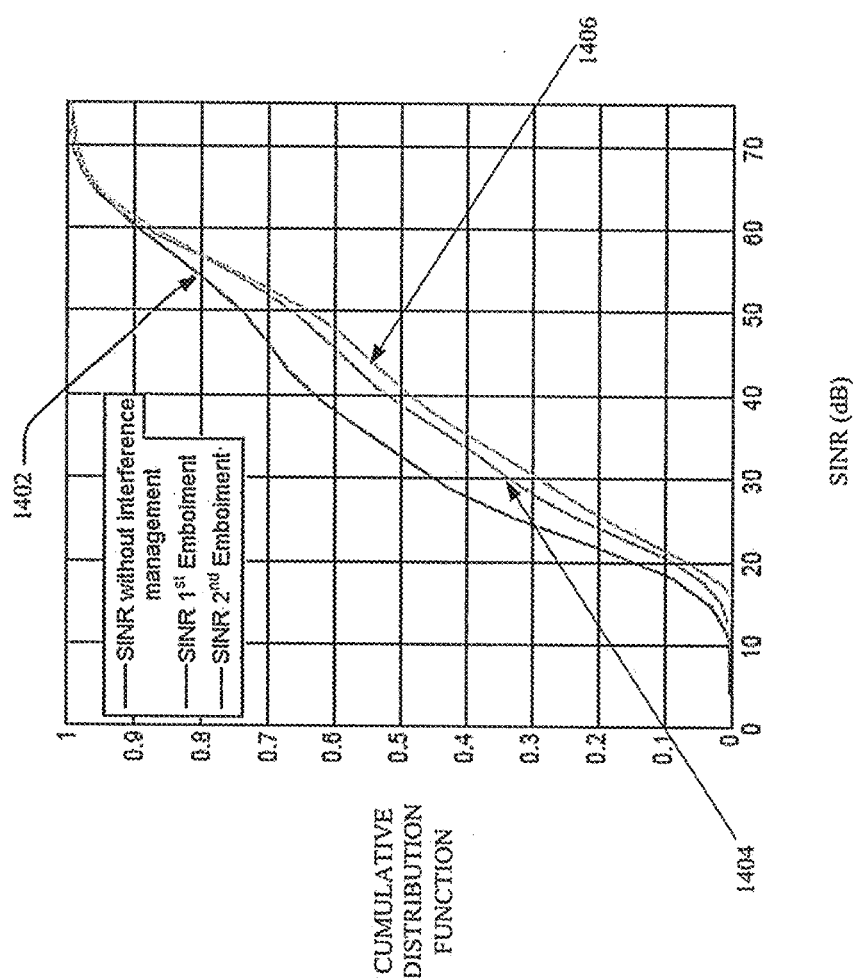
FIG. 14 is a graph illustrating signal-to-interference noise ratio (SINR) without interference management and SINR with first and second embodiments of interference management in accordance with the simulation described with reference to FIG. 12.

FIG. 14 is a graph illustrating SINR without interference management and SINR with first and second embodiments of interference management in accordance with the simulation described with reference to FIG. 12. FIG. 14 shows cumulative distribution function (CDF) versus SINR in particular.

With reference to FIG. 14, the statistics of SINR without interference management 1402, SINR with the first embodiment of interference management 1404, and SINR with the second embodiment of interference management 1406 are collected and shown to quantify the performance of the first and second embodiments of interference management described herein. In FIG. 14, the line in the right side of the graph shows better performance than the line in the left side of the graph. As shown, both the first and the second embodiments are improvements over the case in which no interference management is employed. Further, the results with the second embodiment of interference management is an improvement over the results with the first embodiment.

SINR with the second embodiment 1406 has better performance (e.g., the largest SINR values) than the SINR with the first embodiment 1404. According to FIG. 14, the first and second embodiments have larger SINR values than the case without interference management. For example, when the CDF is equal to 0.5, the first embodiment has a 7 decibel (dB) improvement in SINR and the second embodiment has an approximate 9 dB improvement. These results show that the first and second embodiments can suppress the interference level and enhance the system performance.

Figure 15:
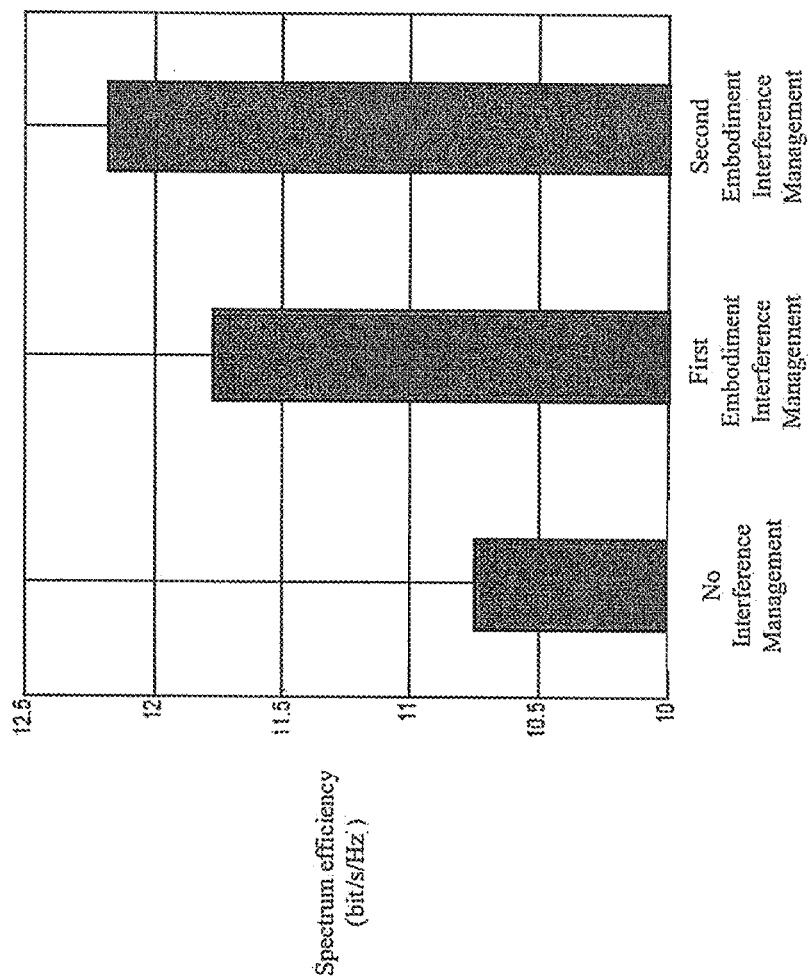
FIG. 15 is a graph illustrating spectrum efficiency without interference management and with the first and second embodiments of interference management in accordance with the simulation described with reference to FIG. 12.

FIG. 15 is a graph illustrating spectrum efficiency without interference management and with the first and second embodiments of interference management in accordance with the simulation described with reference to FIG. 12. FIG. 15 shows spectrum efficiency versus different interference management schemes (e.g., no interference management scheme, first embodiment interference management scheme, and second embodiment interference management scheme) in particular.

With reference to FIG. 15, based on the SINR statistics, the downlink average spectrum efficiency can be computed with following formula:

$$\text{average spectrum efficiency} = \frac{\left(1 - \frac{T_O}{T_C}\right) \sum_{t=1}^{T} \sum_{m=1}^{M} \log_2(1 + SINR_{t,m})}{T * M}$$

where $T_C$ is the length of transmit time interval (TTI), $T_O$ is the length of training time (including uplink and downlink training time), M is the number of mobile devices in the mmW cellular network, T is the number of TTI, $SINR_{t,m}$ is the SINR of mobile device m in TTI t. For example, $T_O$ is the entire set of N training slots for the uplink and downlink. The uplink and downlink can employ 2N times training and $2Nt=T_O$, where t is the time for one training.

The spectrum efficiency can be computed for different SINR statistics under transmit power 30 decibel-milliwatt (dBm) (e.g., 0 dB) and thermal noise density −174 dBm/Hertz (Hz). It is observed that, compared with the spectrum efficiency of SINR without interference management, the first interference management embodiment and the second interference management embodiment can obtain 1 bit/second(s)/Hz and 1.5 bit/s/Hz improvement in spectrum efficiency, respectively.

Figure 16:
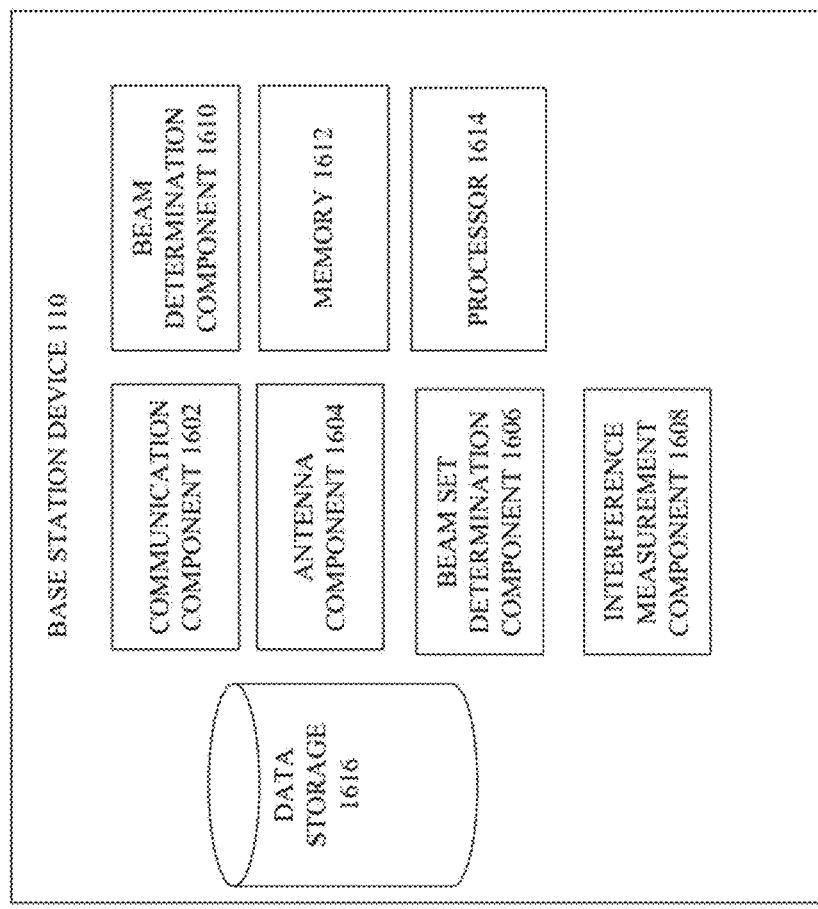
FIG. 16 is a block diagram of a BS device in a system facilitating interference management in a multi-cell and multi-user mmW cellular network in accordance with the first and second embodiments of the present invention.

FIG. 16 is a block diagram of a BS device in a system facilitating interference management in a multi-cell and multi-user mmW cellular network in accordance with the first and second embodiments of the present invention. The BS device can include communication component 1602, antenna component 1604, beam set determination component 1606, interference measurement component 1608, beam determination component 1610, memory 1612, processor 1614 and/or data storage 1616. In various embodiments, one or more of communication component 1602, antenna component 1604, beam set determination component 1606, interference measurement component 1608, beam determination component 1610, memory 1612, processor 1614 and/or data storage 1616 can be electrically and/or communicatively coupled to one another to perform one or more functions of BS device 110. Repetitive description of like elements employed in other embodiments described herein is omitted for sake of brevity.

The communication component 1602 can transmit and/or receive signals such as the data signals and control signals. The antenna component 1604 can use beamforming techniques to generate the desired beam with the given precoder or combiner (e.g., wide beam and narrow beam) to transmit and receive signals. The beam set determination component 1606 can process the best-M-beams set such as that described with reference to FIG. 6. The interference measurement component 1608 can measure the interference that the beams in the best-M-beams set suffered for updating the best-M-beams set such as that described in the second embodiment with reference to FIG. 11. The beam determination component 1610 can determine the P-beams-no-interference set, the Q-beams-with-interference set and/or the beam(i) and beam(j). The beam determination component 1610 can also determine the narrow beam described with reference to FIG. 8.

Memory 1612 can be a computer-readable storage medium storing computer-executable instructions and/or information configured to perform one or more of the functions described herein with reference to the BS device 110. The processor 1612 can perform one or more of the functions described herein with reference to the BS device 110.

Data storage 1616 can store information such as the best precoder index, the P-beams-no-interference set, the Q-beams-with-interference set, uplink channel information, uplink channel interference information and/or any other information for facilitating interference management in multi-cell and multi-user mmW cellular networks.

Figure 17:
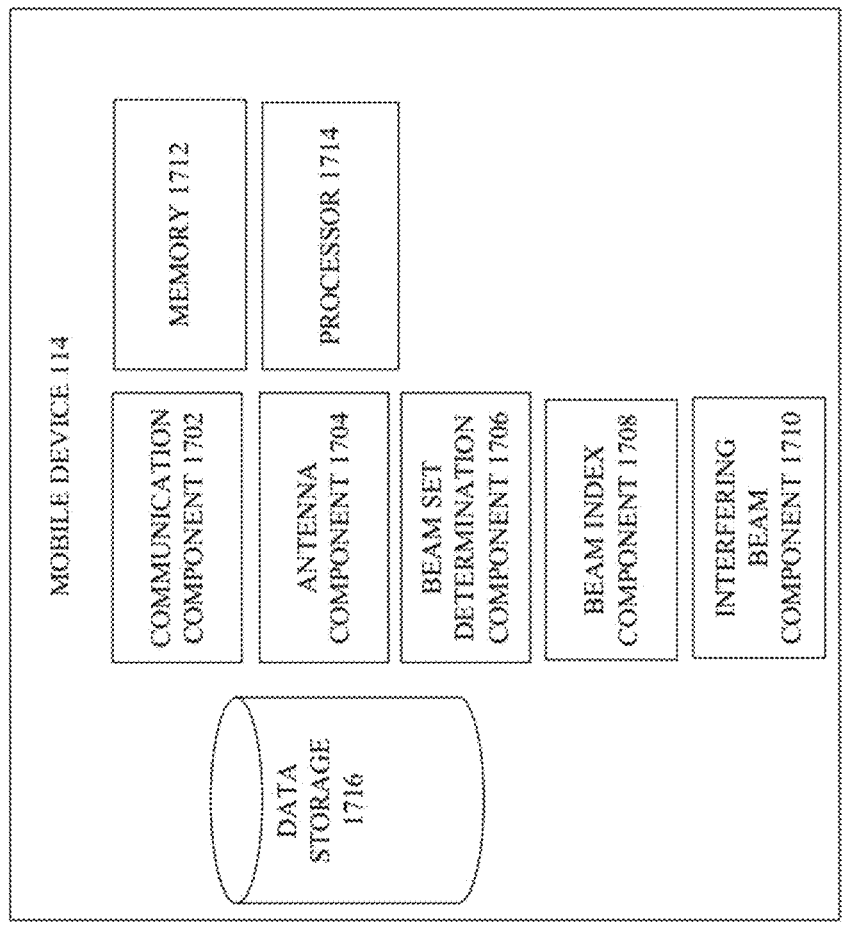
FIG. 17 is a block diagram of a mobile device in a system for which interference management can be facilitated in a multi-cell and multi-user mmW cellular network in accordance with the first and second embodiments of the present invention.

FIG. 17 is a block diagram of a mobile device in a system for which interference management can be facilitated in a multi-cell and multi-user mmW cellular network in accordance with the first and second embodiments of the present invention. The mobile device 114 can include communication component 1702, antenna component 1704, beam set determination component 1706, beam index component 1708, interfering beam component 1710, memory 1712, processor 1714 and/or data storage 1716. In various embodiments, one or more of communication component 1702, antenna component 1704, beam set determination component 1706, beam index component 1708, interfering beam component 1710, memory 1712, processor 1714 and/or data storage 1716 can be communicatively and/or electrically coupled to one another to perform one or more functions of mobile device 114.

The communication component 1702 can transmit and/or receive signals such as the data signals and control signals. The antenna component 1704 can use beamforming techniques to generate desire beam given the precoder or combiner (e.g., wide beam and narrow beam) to transmit and receive signals. The beam set determination component 1706 can determine and/or process the best-M-beams set such as that described with reference to FIG. 4. The beam index component 1708 can determine and/or process beam index received from the BS device with reference to FIG. 2. The interfering beam component 1710 can determine and/or process the worst L interference beams set such as that described with reference to FIG. 4.

Memory 1712 can be a computer-readable storage medium storing computer-executable instructions and/or information configured to perform one or more of the functions described herein with reference to the mobile device 114. The processor 1714 can perform one or more of the functions described herein with reference to the mobile device 114. Data storage 1716 can store information such as downlink training information, downlink notification information, best beam index, best-M-beams set, worst-L-interfering beam set and the like.

Figure 18:
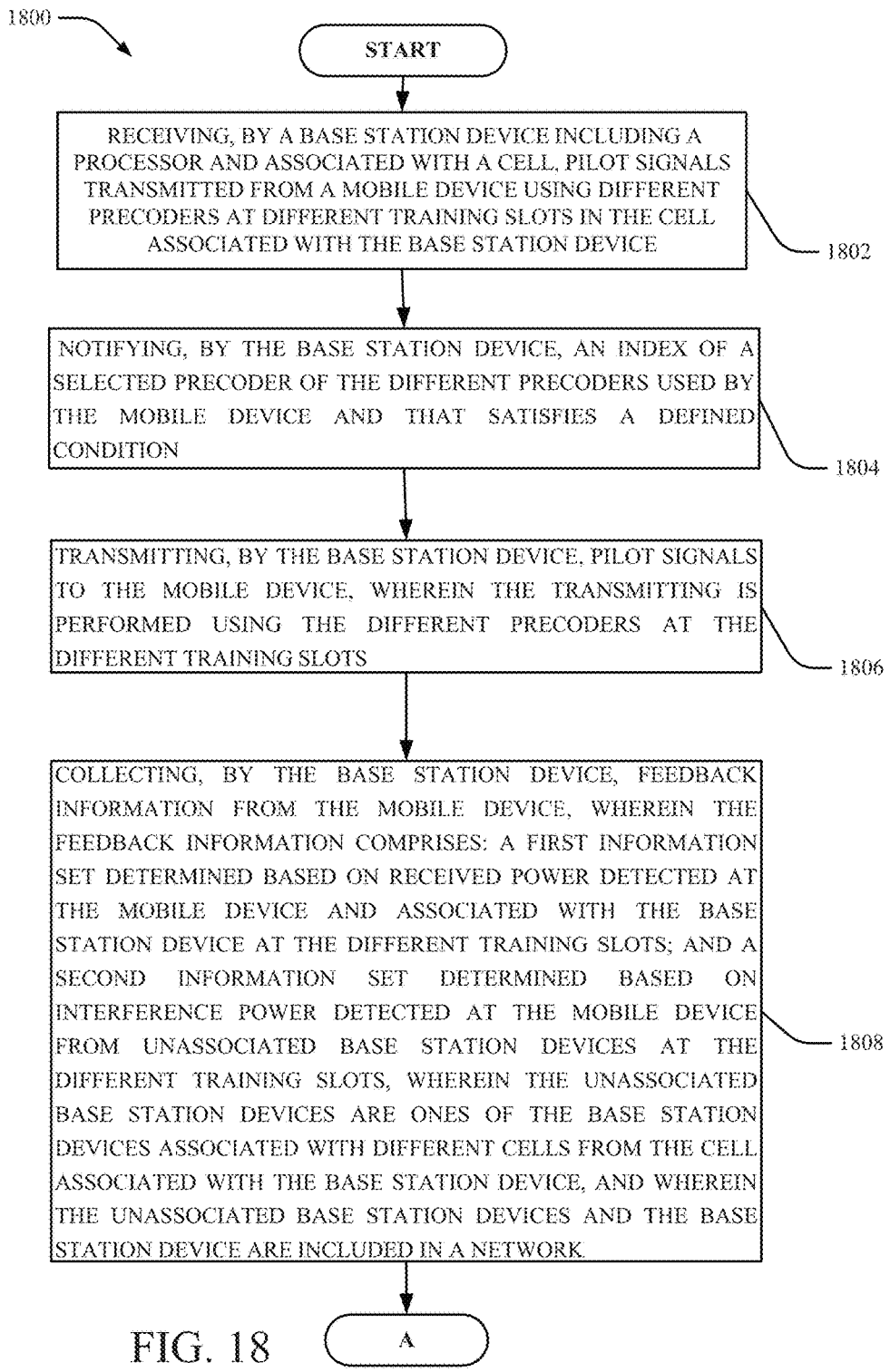
FIGS. 18, 19, 20 and 21 are flow diagrams illustrating methods of interference management in accordance with first and second embodiments of the present invention.
Figure 19:
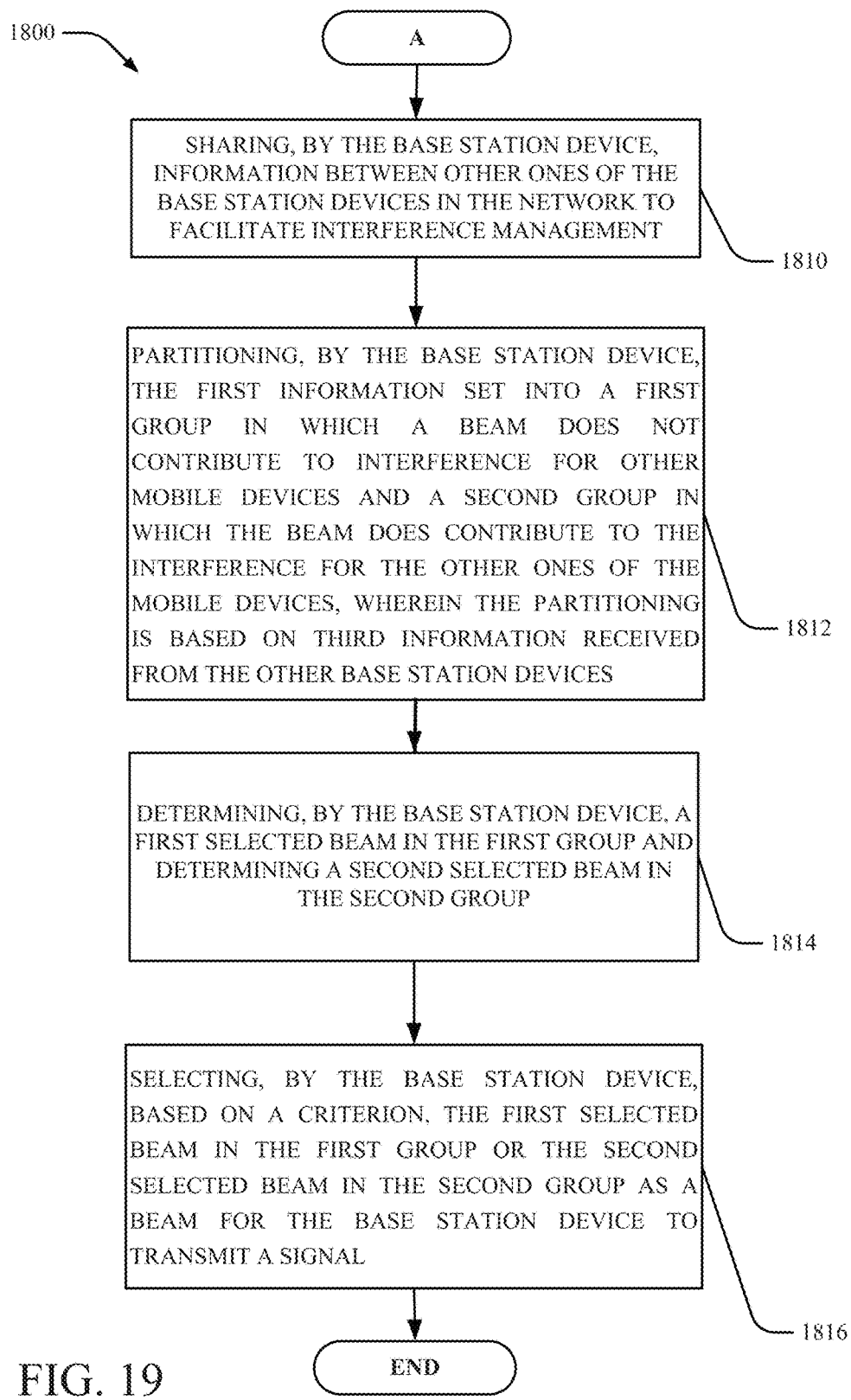

FIGS. 18, 19, 20 and 21 are flow diagrams illustrating methods of interference management in accordance with first and second embodiments of the present invention. Turning first to FIGS. 18 and 19, method 1800 is shown. At 1802, method 1800 can include receiving, by a base station device including a processor and associated with a cell, pilot signals transmitted from a mobile device using different precoders at different training slots in the cell associated with the base station device. At 1804, method 1800 can include notifying, by the base station device, an index of a selected precoder of the different precoders used by the mobile device and that satisfies a defined condition.

At 1806, method 1800 can include transmitting, by the base station device, pilot signals to the mobile device, wherein the transmitting is performed using the different precoders at the different training slots.

At 1808, method 1800 can include collecting, by the base station device, feedback information from the mobile device, wherein the feedback information includes: a first information set determined based on received power detected at the mobile device and associated with the base station device at the different training slots; and a second information set determined based on interference power detected at the mobile device from unassociated base station devices at the different training slots. The unassociated base station devices are ones of the base station devices associated with different cells from the cell associated with the base station device, and wherein the unassociated base station devices and the base station device are included in a network.

At 1810, method 1800 can include sharing, by the base station device, information between other ones of the base station devices in the network to facilitate interference management.

At 1812, method 1800 can include partitioning, by the base station device, the first information set into a first group in which a beam does not contribute to interference for other mobile devices and a second group in which the beam does contribute to the interference for the other ones of the mobile devices, wherein the partitioning is based on third information received from the other base station devices.

At 1814, method 1800 can include determining, by the base station device, a first selected beam in the first group and determining a second selected beam in the second group.

At 1816, method 1800 can include selecting, by the base station device, based on a criterion, the first selected beam in the first group or the second selected beam in the second group as a beam for the base station device to transmit a signal.

In some embodiments, the selecting the first selected beam or the second selected beam includes: selecting the second selected beam in the second group as the beam for the base station device to transmit the signal based on a determination that the first group includes no beams and the second group includes beams; and selecting the first selected beam in the first group as the beam for base station device to transmit the signal based on a determination that the second group includes no beams and the first group includes beams.

In some embodiments, the selecting the beam for the base station device to transmit the signal further includes: selecting the first selected beam in the first group as the beam for the base station device to transmit the signal based on a determination that both the first group and the second group include beams and a received power of the first selected beam in the first group is greater than or equal to a defined value. The defined value can be a difference between a received power of the second selected beam in the second group and a second power, and wherein the second power is computed as a product of a defined experience value and an interference power of the second selected beam in the second group.

In some embodiments, the selecting the beam for the base station device to transmit the signal further includes: selecting the second selected beam in the second group as the beam for the base station device based on a determination that both the first group and the second group include beams and a received power of first selected beam in the first group is less than a defined value. The defined value can be a difference between the received power of the second selected beam in the second group and a second power, and wherein the second power is computed as a product of a defined experience value and an interference power of the second selected beam in the second group.

In some embodiments, the first selected beam in the first group does not contribute to interference for the other mobile devices and has a maximum received power among beams in the first group. In some embodiments, the second selected beam in the second group contributes to interference for the other mobile devices and has a maximum received power-to-interference ratio among beams in the second group. In some embodiments, the third information is indicative of the shared second information set in the network from another base station device other than the base station device.

Although not shown, method 1800 can also include determining, by the base station device, whether any beams in the first information set are reported as interfering beams in the second information set in the network.

In some embodiments, the method includes, for a beam in the first information set that is reported as an interfering beam in the second information set in the network, determining a first overall interference that the beam in the first information set provides to other mobile devices; and the method includes, for another beam in the first information set that is not reported as an interfering beam in the second information set in the network, determining a second overall interference that the beam in the first beam set provides to other mobile devices as zero.

In some embodiments, the base station device includes a millimeter wave base station device. The base station device can collect the feedback information, the first information set and the second information set, from associated mobile devices.

Figure 20:
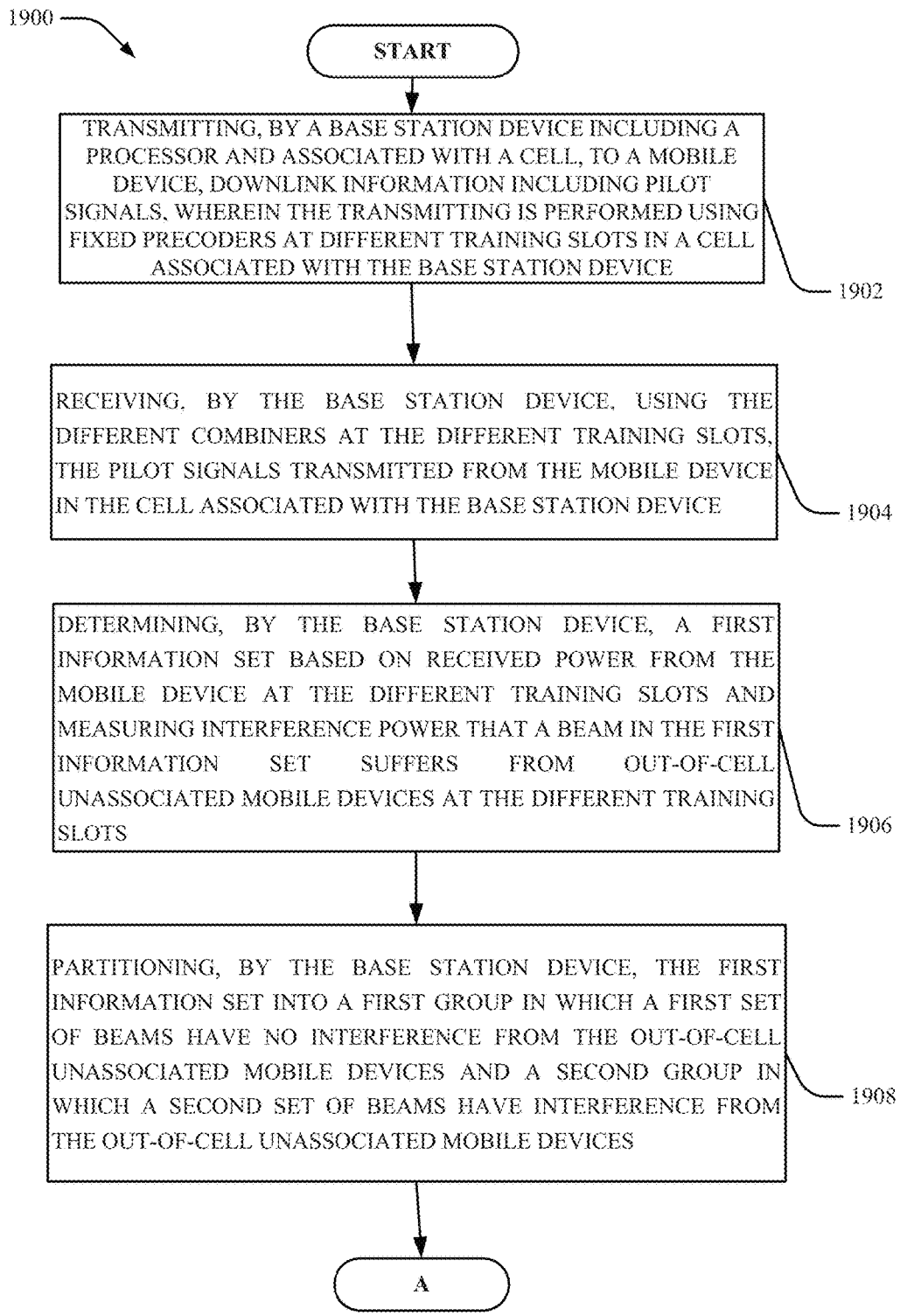
Figure 21:
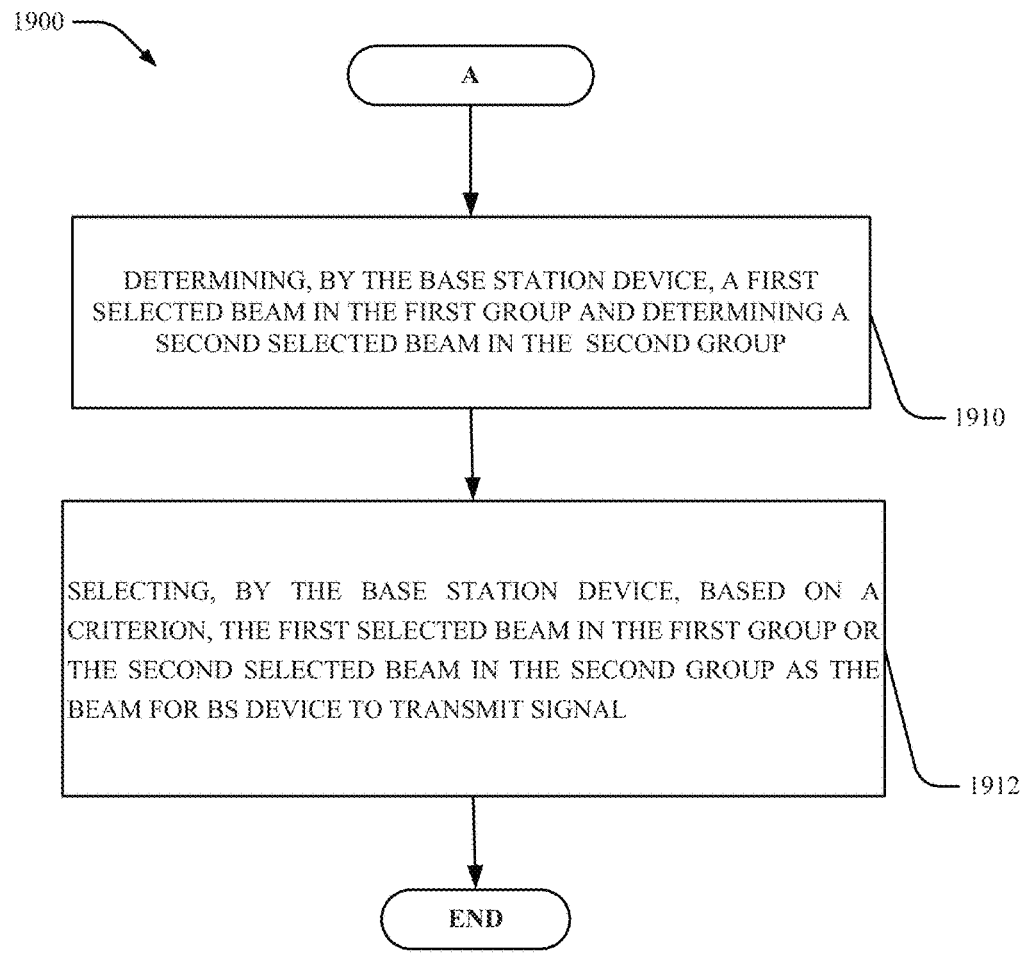

Turning now to FIGS. 20 and 21, method 1900 is shown. At 1902, method 1900 can include transmitting, by a base station device including a processor and associated with a cell, to a mobile device, downlink information including pilot signals, wherein the transmitting is performed using fixed precoders at different training slots in a cell associated with the base station device. At 1904, method 1900 can include receiving, by the base station device, using the different combiners at the different training slots, the pilot signals transmitted from the mobile device in the cell associated with the base station device.

At 1906, method 1900 can include determining, by the base station device, a first information set based on received power from the mobile device at the different training slots and measuring interference power that a beam in the first information set suffers from out-of-cell unassociated mobile devices at the different training slots.

In some embodiments, the first selected beam in the first group does not suffer interference from the other mobile devices and has a maximum received power among beams in the first group. In some embodiments, the second selected beam in the second group suffers interference from the other mobile devices and has a maximum received power-to-interference ratio among the beams in the second group.

At 1908, method 1900 can include partitioning, by the base station device, the first information set into a first group in which a first set of beams have no interference from the out-of-cell unassociated mobile devices and a second group in which a second set of beams have interference from the out-of-cell unassociated mobile devices.

At 1910, method 1900 can include determining, by the base station device, a first selected beam in the first group and determining a second selected beam in the second group.

At 1912, method 1900 can include selecting, by the base station device, based on a criterion, the first selected beam in the first group or the second selected beam in the second group as the beam for the base station device to transmit a signal. In some embodiments, selecting the beam for the base station device to transmit the signal includes: selecting the second selected beam in the second group as the beam for the base station device to transmit the signal based on a determination that the first group includes no beams and the second group includes beams, and selecting the first selected beam in the first group as the beam for base station device to transmit the signal based on a determination that the second group includes no beams and the first group includes beams.

In some embodiments, the selecting the beam for the base station device to transmit the signal further includes: selecting the first selected beam in the first group as the beam for the base station device to transmit the signal based on a determination that both the first group and the second group include beams and a received power of the first selected beam in the first group is greater than or equal to a defined value. In some embodiments, the defined value is a difference between the received power of the second selected beam in the second group and a second power, and wherein the second power is computed as a product of a defined experience value and an interference power of the second selected beam in the second group.

In some embodiments, the selecting the beam further includes: selecting the second selected beam in the second group as the beam for the base station device to transmit the signal based on a determination that both the first group and the second group include beams and the received power of the first selected beam in the first group is smaller than a defined value. The defined value can be a difference between the power of the second selected beam in the second group and a second power, and wherein the second power is computed as a product of a defined experience value and the interference power of the second selected beam in the second group.

The base station device can be a millimeter wave base station device configured to transmit the signal, and the signal can control and data information.

Although not shown, method 1900 can also include performing, by base station device, downlink interference management based on uplink power and interference information by utilization of channel reciprocity in a time division duplex system.

In some embodiments, yet another method can be provided. The method can include determining, by base station device including a processor, a first information set based on received power from associated mobile device at different training slots and measuring interference power that a beam in the first information set suffers from out-of-cell unassociated mobile devices at the different training slots.

The method can also include partitioning, by the base station device, the first information set into a first group in which a first set of beams have no interference from other mobile devices and a second group in which a second set of beams have interference from other mobile devices. The method can also include determining, by the base station device, a first selected beam in the first group and determining a second selected beam in the second group.

The method can also include selecting, by the base station device, based on a criterion, the first selected beam in the first group or the second selected beam in the second group as the beam for the base station device to transmit a signal. In some embodiments, the selecting the first selected beam or the second selected beam includes: selecting the second selected beam in the second group as the beam for the base station device to transmit the signal based on a determination that the first group includes no beams and the second group includes beams, and selecting the first selected beam in the first group as the beam for base station device to transmit the signal based on a determination that the second group includes no beams and the first group includes beams. In some embodiments, the selecting the beam for the base station device to transmit the signal further includes: selecting the first selected beam in the first group as the beam for the base station device to transmit the signal based on a determination that both the first group and the second group include beams and a received power of the first selected beam in the first group is greater than or equal to a defined value. The defined value can be a difference between a received power of a second selected beam in the second group and a second power, and wherein the second power is computed as a product of a defined experience value and an interference power of the second selected beam in the second group.

In some embodiments, the selecting the beam for the base station device to transmit the signal further includes: selecting the second selected beam in the second group as the beam for the base station device based on a determination that both the first group and the second group include beams and a received power of first selected beam in the first group is less than a defined value. The defined value can be a difference between the power of the second selected beam in the second group and a second power, and wherein the second power is computed as a product of a defined experience value and an interference power of the second selected beam in the second group.

Figure 22:
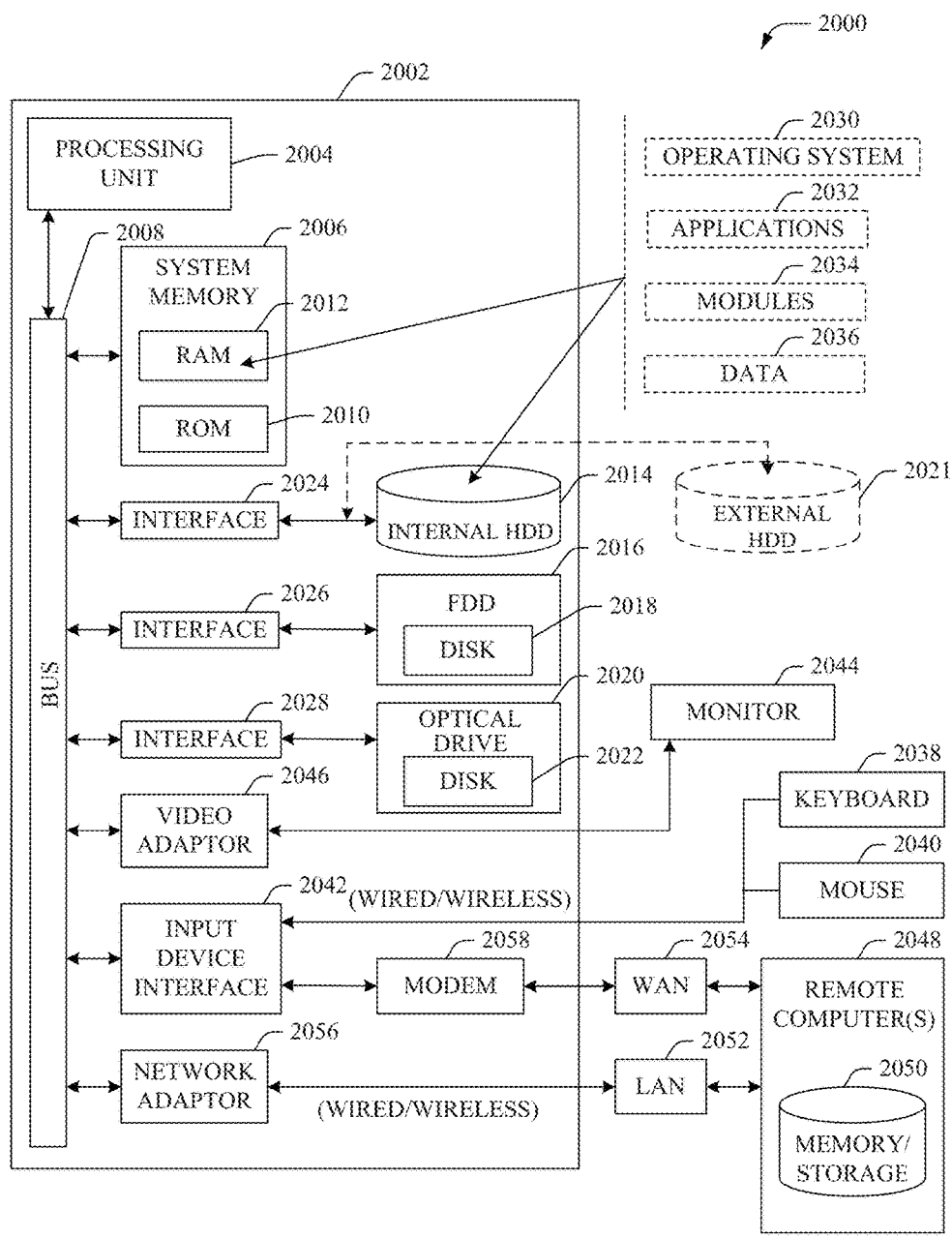
FIG. 22 is a block diagram of a computer that can be employed to facilitate interference management in a multi-cell and multi-user mmW cellular network in accordance with the first and second embodiments of the present invention.

FIG. 22 is a block diagram of a computer that can be employed to facilitate interference management in a multi-cell and multi-user mmW cellular network in accordance with the first and second embodiments of the present invention. Repetitive description of like elements employed in other embodiments described herein is omitted for sake of brevity.

In some embodiments, the computer, or a component of the computer, can be or be included within any number of components described herein comprising, but not limited to, BS devices 108, 110, 112 and/or mobile devices 114, 116, 118 (or a component of BS devices 108, 110, 112 and/or mobile devices 114, 116, 118).

In order to provide additional text for various embodiments described herein, FIG. 22 and the following discussion are intended to provide a brief, general description of a suitable computing environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and includes both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments of the embodiments described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multiprocessor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2010 (e.g., EIDE, SATA), which internal hard disk drive 2014 can also be configured for external use in a suitable chassis (not shown), a magnetic floppy disk drive 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface, respectively. The interface 2024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 2002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

A communication device can enter commands and information into the computer 2002 through one or more wired/wireless input devices, e.g., a keyboard 2038 and a pointing device, such as a mouse 2040. Other input devices (not shown) can include a microphone, an infrared (IR) remote control, a joystick, a game pad, a stylus pen, touch screen or the like. These and other input devices are often connected to the processing unit 2004 through an input device interface 2042 that can be coupled to the system bus 2008, but can be connected by other interfaces, such as a parallel port, an IEEE 1394 serial port, a game port, a universal serial bus (USB) port, an IR interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless AP disposed thereon for communicating with the wireless adapter 2056.

When used in a WAN networking environment, the computer 2002 can include a modem 2058 or can be connected to a communications server on the WAN 2054 or has other means for establishing communications over the WAN 2054, such as by way of the Internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable (or machine-readable) storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

It is to be understood that the embodiments described herein can be implemented in hardware, software or a combination thereof. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments can be implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a base station device comprising a processor and associated with a cell, pilot signals transmitted from a mobile device using different precoders at different training slots in the cell associated with the base station device;
notifying, by the base station device, a mobile device of an index of a selected precoder of the different precoders used by the mobile device and that satisfies a defined condition;
transmitting, by the base station device, pilot signals to the mobile device, wherein the transmitting is performed using the different precoders at the different training slots;
collecting, by the base station device, feedback information from the mobile device, wherein the feedback information comprises:
a first information set determined based on received powers detected at the mobile device and associated with the base station device at the different training slots; and
a second information set determined based on interference powers detected at the mobile device from unassociated base station devices at the different training slots, wherein the unassociated base station devices are ones of the base station devices associated with different cells from the cell associated with the base station device, and wherein the unassociated base station devices and the base station device are included in a network;
sharing, by the base station device, the second information set between other ones of the base station devices in the network to facilitate interference management;
partitioning, by the base station device, the first information set into a first group in which a beam does not cause interference to other mobile devices and a second group in which the beam does cause interference to the other ones of the mobile devices, wherein the partitioning is based on third information received from the other base station devices;
determining, by the base station device, a first selected beam in the first group and determining a second selected beam in the second group; and
selecting, by the base station device, based on a criterion, the first selected beam in the first group or the second selected beam in the second group as a beam for the base station device to transmit a signal, wherein the selecting the first selected beam or the second selected beam comprises:
selecting the second selected beam in the second group as the beam for the base station device to transmit the signal based on a determination that the first group includes no beams and the second group includes beams; and
selecting the first selected beam in the first group as the beam for base station device to transmit the signal based on a determination that the second group includes no beams and the first group includes beams.

2. The method of claim 1, wherein the selecting the beam for the base station device to transmit the signal further comprises:
selecting the first selected beam in the first group as the beam for the base station device to transmit the signal based on a determination that both the first group and the second group include beams and a received power of the first selected beam in the first group is greater than or equal to a defined value.

3. The method of claim 2, wherein the defined value is a difference between the received power of the second selected beam in the second group and a second power, and wherein the second power is computed as a product of a defined experience value and an interference power of the second selected beam in the second group.

4. The method of claim 1, wherein the selecting the beam for the base station device to transmit the signal further comprises:
selecting the second selected beam in the second group as the beam for the base station device based on a determination that both the first group and the second group include beams and a received power of first selected beam in the first group is less than a defined value.

5. The method of claim 4, wherein the defined value is a difference between the received power of the second selected beam in the second group and a second power, and wherein the second power is computed as a product of a defined experience value and an interference power of the second selected beam in the second group.

6. The method of claim 1, wherein the first selected beam in the first group does not cause interference to the other mobile devices and has a maximum received power among beams in the first group.

7. The method of claim 1, wherein the second selected beam in the second group cause interference to the other mobile devices and has a maximum received power-to-interference ratio among beams in the second group.

8. The method of claim 1, wherein the third information is indicative of the shared second information set in the network from another base station device other than the base station device.

9. The method of claim 1, wherein:
for a beam in the first information set that is reported as an interfering beam in the shared second information set in the network, determining overall interference that the beam in the first information set imposes to other mobile devices; and
for another beam in the first information set that is not reported as an interfering beam in the shared second information set in the network, determining the overall interference that the beam in the first beam set imposes to other mobile devices as zero.

10. The method of claim 1, wherein the base station device comprises a base station device operated on millimeter wave bands.

11. The method of claim 1, wherein the base station device collects the feedback information, the first information set and the second information set, from the mobile device.

12. A non-transitory computer-readable medium storing computer-executable instructions that, in response to execution, cause a processor of a base station device associated with a cell to perform operations, comprising:
receiving pilot signals transmitted from a mobile device using different precoders at different training slots in the cell associated with the base station device;
notifying a mobile device of an index of a selected precoder of the different precoders used by the mobile device and that satisfies a defined condition;
transmitting pilot signals to the mobile device, wherein the transmitting is performed using the different precoders at the different training slots;
collecting feedback information from the mobile device, wherein the feedback information comprises:
a first information set determined based on received powers detected at the mobile device and associated with the base station device at the different training slots; and
a second information set determined based on interference powers detected at the mobile device from unassociated base station devices at the different training slots, wherein the unassociated base station devices are ones of the base station devices associated with different cells from the cell associated with the base station device, and wherein the unassociated base station devices and the base station device are included in a network;
sharing the second information set between other ones of the base station devices in the network to facilitate interference management;
partitioning the first information set into a first group in which a beam does not cause interference to other mobile devices and a second group in which the beam causes interference to the other ones of the mobile devices, wherein the partitioning is based on third information shared by the other base station devices;
determining a first selected beam in the first group and determining a second selected beam in the second group; and
selecting based on a criterion, the first selected beam in the first group or the second selected beam in the second group as a beam for the base station device to transmit a signal, wherein the selecting the first selected beam or the second selected beam comprises:
selecting the second selected beam in the second group as the beam for the base station device to transmit the signal based on a determination that the first group includes no beams and the second group includes beams; and
selecting the first selected beam in the first group as the beam for base station device to transmit the signal based on a determination that the second group includes no beams and the first group includes beams.

13. The non-transitory computer-readable medium of claim 12, wherein the selecting the beam for the base station device to transmit the signal further comprises:
selecting the first selected beam in the first group as the beam for the base station device to transmit the signal based on a determination that both the first group and the second group include beams and a received power of the first selected beam in the first group is greater than or equal to a defined value.

14. The non-transitory computer-readable medium of claim 13, wherein the defined value is a difference between the received power of the second selected beam in the second group and a second power, and wherein the second power is computed as a product of a defined experience value and an interference power of the second selected beam in the second group.

15. The non-transitory computer-readable medium of claim 12, wherein the selecting the beam for the base station device to transmit the signal further comprises:
selecting the second selected beam in the second group as the beam for the base station device based on a determination that both the first group and the second group include beams and a received power of first selected beam in the first group is less than a defined value.

16. The non-transitory computer-readable medium of claim 15, wherein the defined value is a difference between the received power of the second selected beam in the second group and a second power, and wherein the second power is computed as a product of a defined experience value and an interference power of the second selected beam in the second group.

17. The non-transitory computer-readable medium of claim 12, wherein the first selected beam in the first group does not cause interference to the other mobile devices and has a maximum received power among beams in the first group.

18. The non-transitory computer-readable medium of claim 12, wherein the second selected beam in the second group causes interference to the other mobile devices and has a maximum received power-to-interference ratio among beams in the second group.

19. The non-transitory computer-readable medium of claim 12, wherein the third information is indicative of the shared second information set in the network from another base station device other than the base station device.

20. The non-transitory computer-readable medium of claim 12, wherein the operations further comprise:

determining, by the base station device, whether any beams in the first information set are reported as interfering beams in the second information set shared in the network.

21. The non-transitory computer-readable medium of claim 20, wherein:
for a beam in the first information set that is reported as an interfering beam in the second information set in the network, determining overall interference that the beam in the first information set imposes to other mobile devices; and
for another beam in the first information set that is not reported as an interfering beam in the second information set in the network, determining the overall interference that the beam in the first beam set provides to other mobile devices as zero.

22. The non-transitory computer-readable medium of claim 12, wherein the base station device comprises base station device operated on millimeter wave bands.

23. The non-transitory computer-readable medium of claim 12, wherein the base station device collects the feedback information, the first information set and the second information set, from the mobile device.

24. The non-transitory computer-readable medium of claim 13, wherein the selecting the beam for the base station device to transmit the signal further comprises:
selecting the second selected beam in the second group as the beam for the base station device based on a determination that both the first group and the second group include beams and a received power of first selected beam in the first group is less than a defined value.

25. The non-transitory computer-readable medium of claim 24, wherein the defined value is a difference between the received power of the second selected beam in the second group and a second power, and wherein the second power is computed as a product of a defined experience value and an interference power of the second selected beam in the second group.

26. A method, comprising:
notifying, by a base station device comprising a processor and associated with a cell, a mobile device, of an index of a selected precoder of different precoders at different training slots in the cell associated with the base station device used by the mobile device and that satisfies a defined condition;
transmitting, by the base station device, pilot signals to the mobile device, wherein the transmitting is performed using the different precoders at the different training slots;
determining, by the base station device, a first selected beam in the first group and determining a second selected beam in the second group; and selecting, by the base station device, based on a criterion, the first selected beam in the first group or the second selected beam in the second group as a beam for the base station device to transmit a signal, wherein the selecting the first selected beam or the second selected beam comprises:
selecting the second selected beam in the second group as the beam for the base station device to transmit the signal based on a determination that the first group includes no beams and the second group includes beams; and
selecting the first selected beam in the first group as the beam for base station device to transmit the signal based on a determination that the second group includes no beams and the first group includes beams.

27. The method of claim 26, wherein the selecting the beam for the base station device to transmit the signal further comprises:
selecting the first selected beam in the first group as the beam for the base station device to transmit the signal based on a determination that both the first group and the second group include beams and a received power of the first selected beam in the first group is greater than or equal to a defined value.

28. The method of claim 27, wherein the defined value is a difference between the received power of the second selected beam in the second group and a second power, and wherein the second power is computed as a product of a defined experience value and an interference power of the second selected beam in the second group.

29. The method of claim 26, wherein the selecting the beam for the base station device to transmit the signal further comprises:
selecting the second selected beam in the second group as the beam for the base station device to transmit the signal based on a determination that both the first group and the second group include beams and a received power of the second selected beam in the second group is greater than or equal to a defined value.

30. The method of claim 29, wherein the defined value is a difference between the received power of the second selected beam in the second group and a second power, and wherein the second power is computed as a product of a defined experience value and an interference power of the second selected beam in the second group.

31. The method of claim 1, further comprising:
determining, by the base station device, whether any beams in the first information set are reported as interfering beams in the shared second information set in the network.

* * * * *